Feb. 24, 1953 T. F. ESERKALN 2,629,293
MACHINE TOOL
Filed May 5, 1948 13 Sheets-Sheet 1

Inventor
Theodore F. Eserkaln
By Peck & Peck
Attorneys.

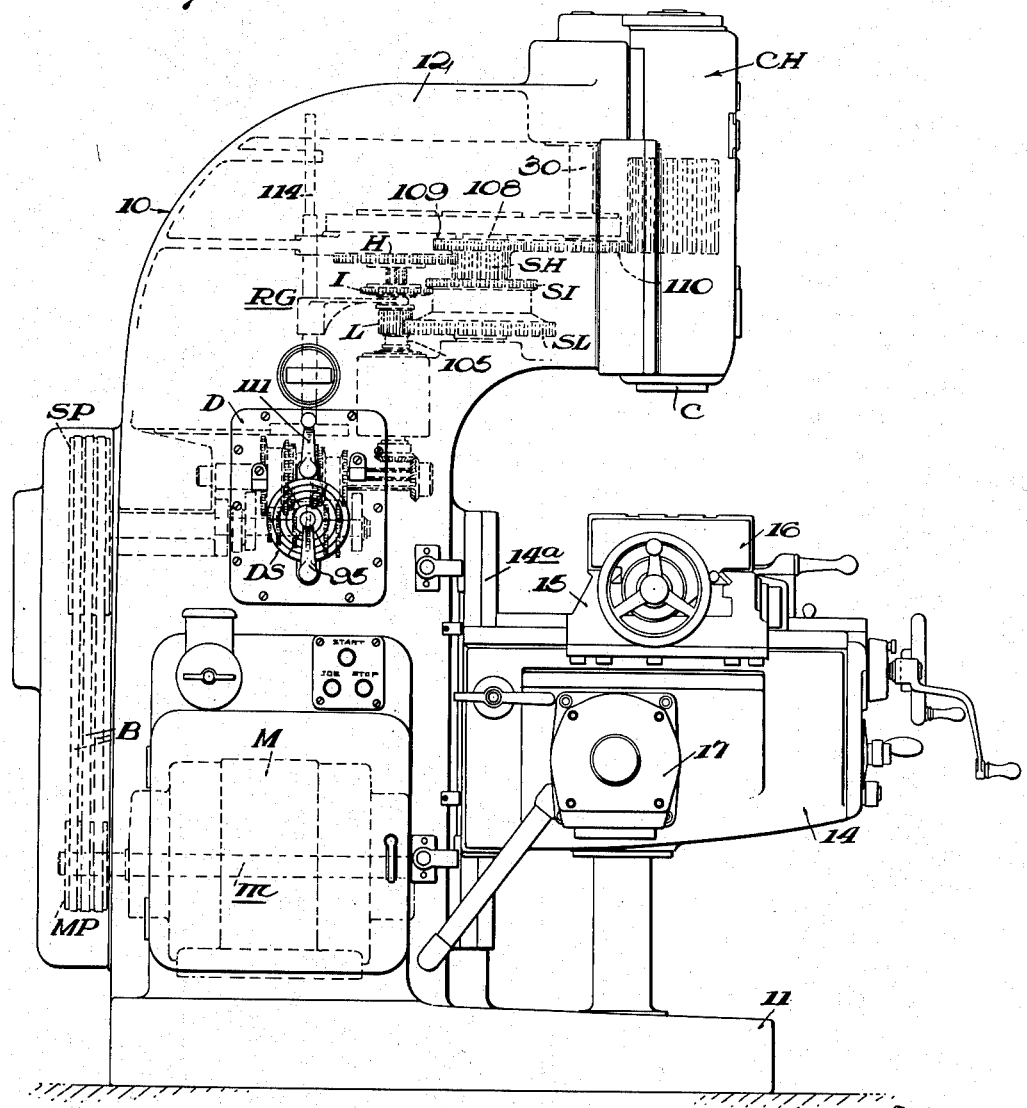

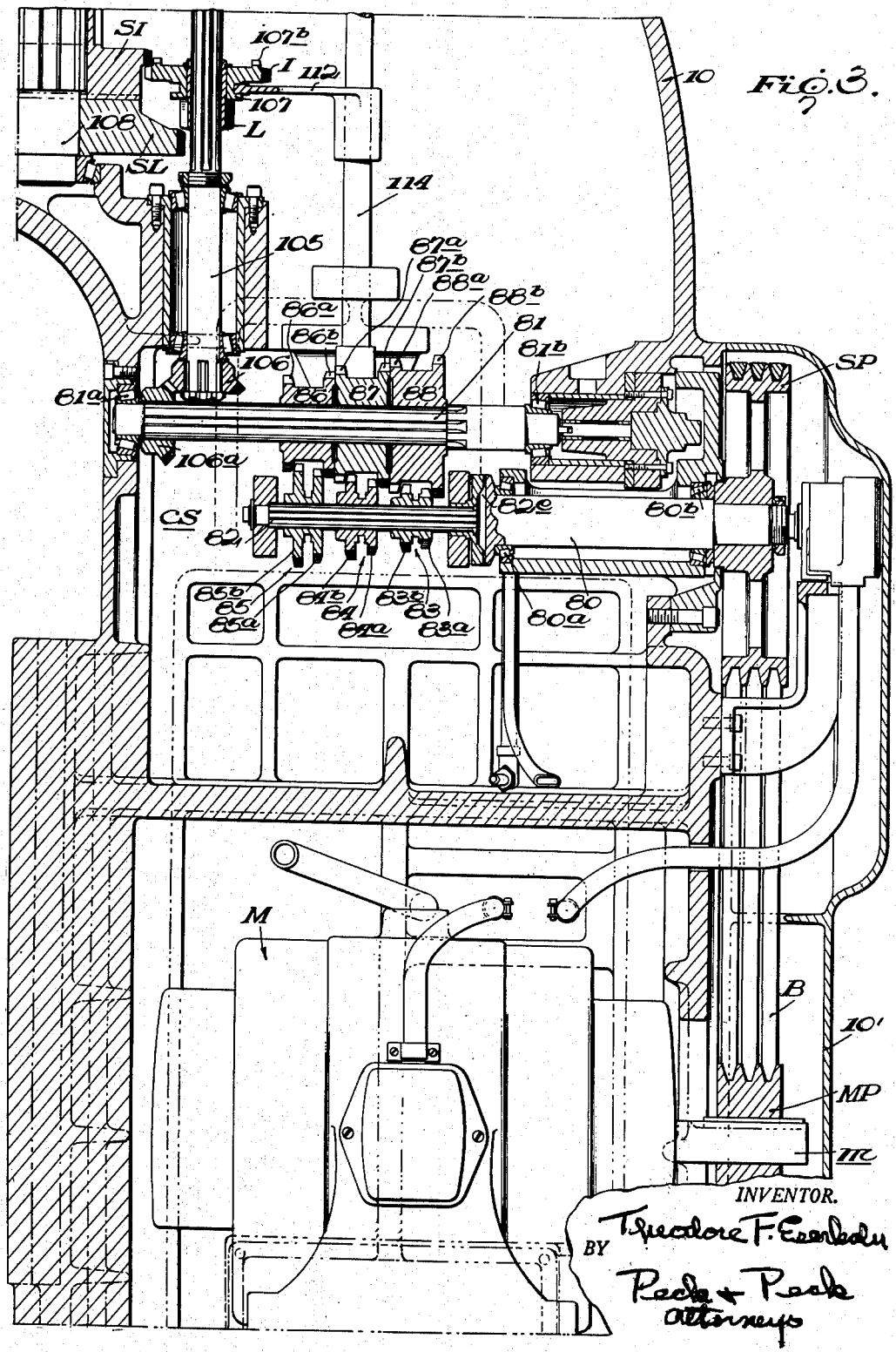

Feb. 24, 1953

T. F. ESERKALN 2,629,293

MACHINE TOOL

Filed May 5, 1948

Inventor
T.F. Eserkaln
Peck + Peck
attorneys.

Feb. 24, 1953 — T. F. ESERKALN — 2,629,293
MACHINE TOOL
Filed May 5, 1948 — 13 Sheets-Sheet 5

INVENTOR.
Theodore F. Eserkaln
BY
Peck & Peck
Attorneys

Feb. 24, 1953 T. F. ESERKALN 2,629,293
MACHINE TOOL
Filed May 5, 1948 13 Sheets-Sheet 6
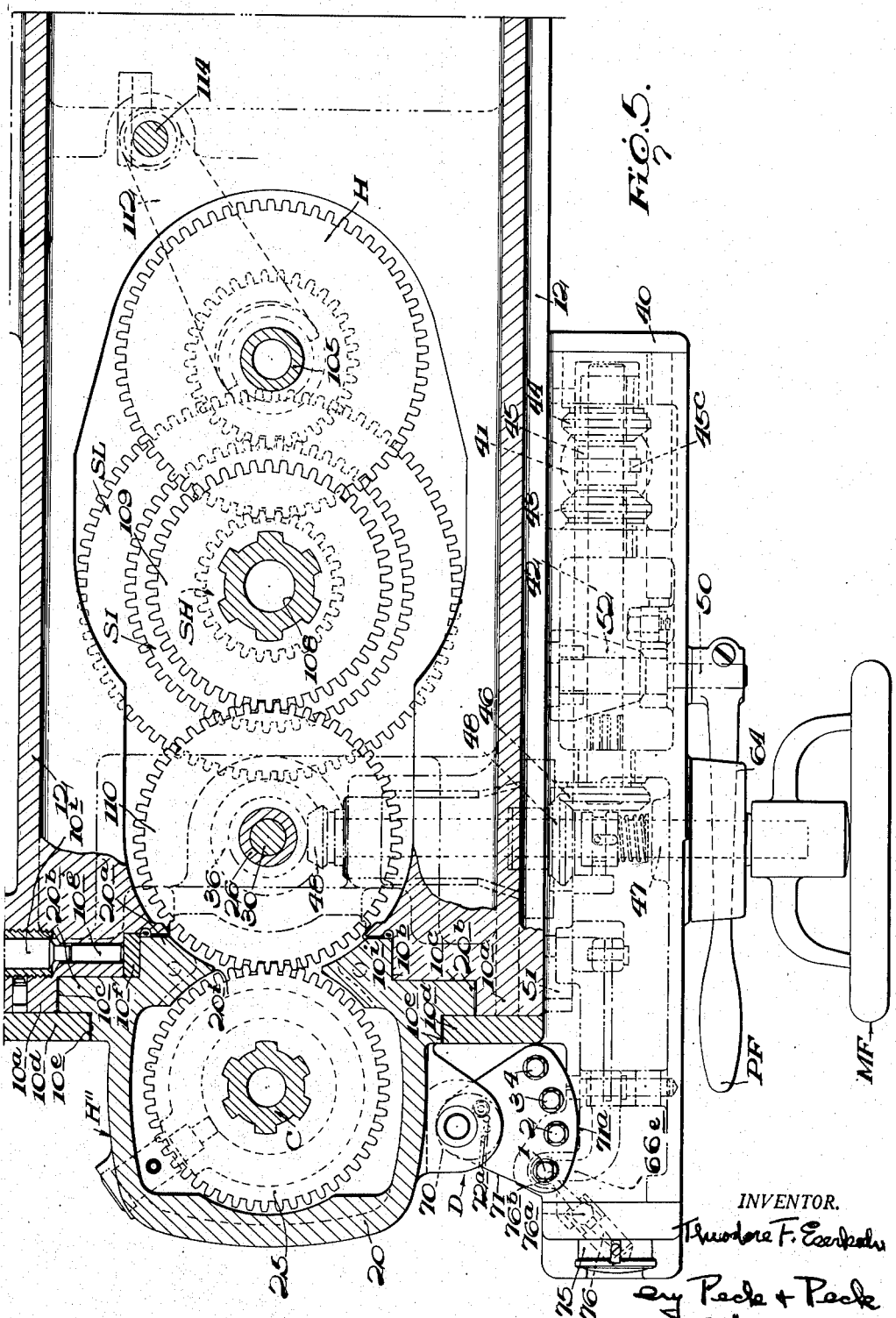
INVENTOR.
Theodore F. Eserkaln
By Peck + Peck
Attorneys

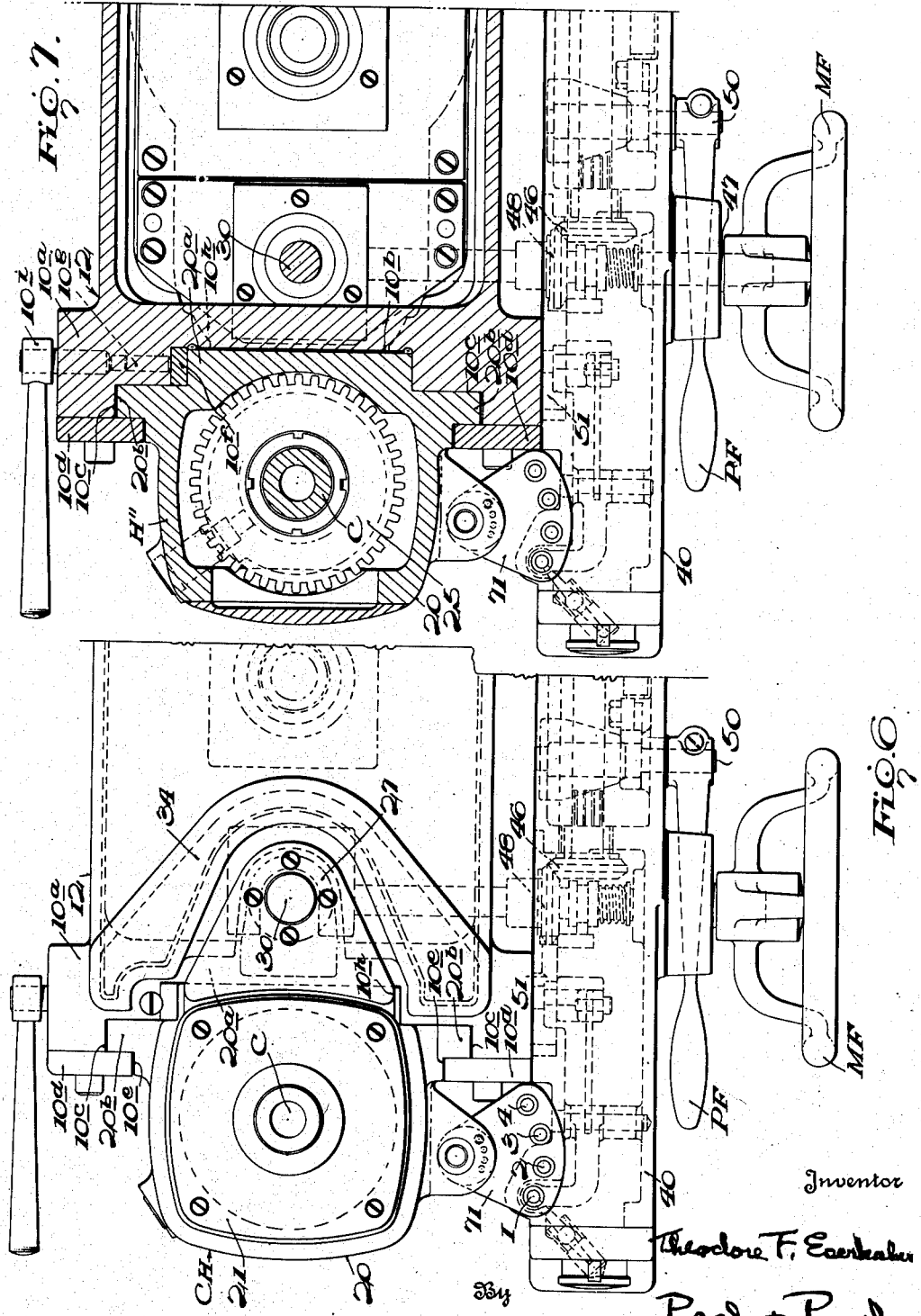

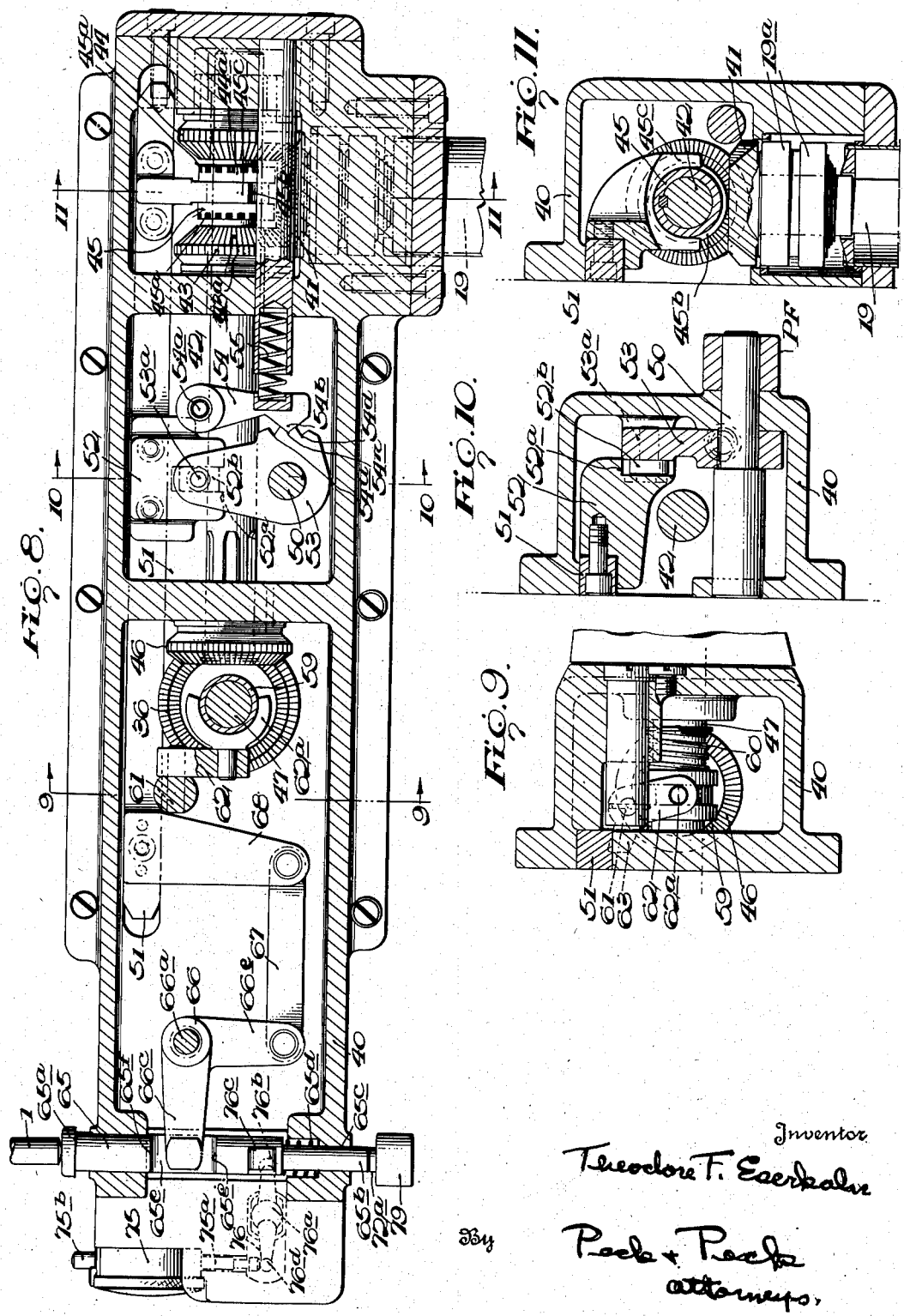

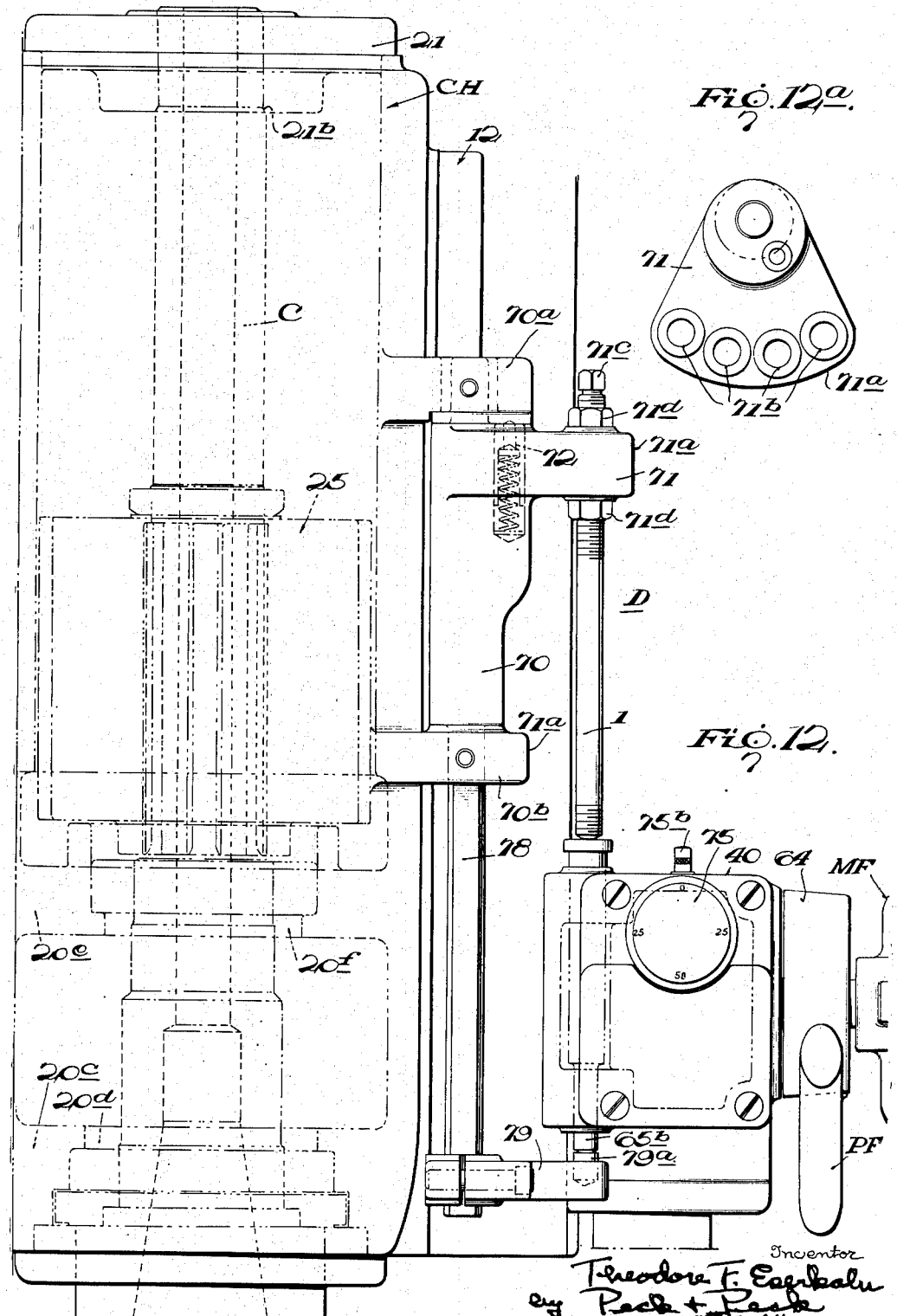

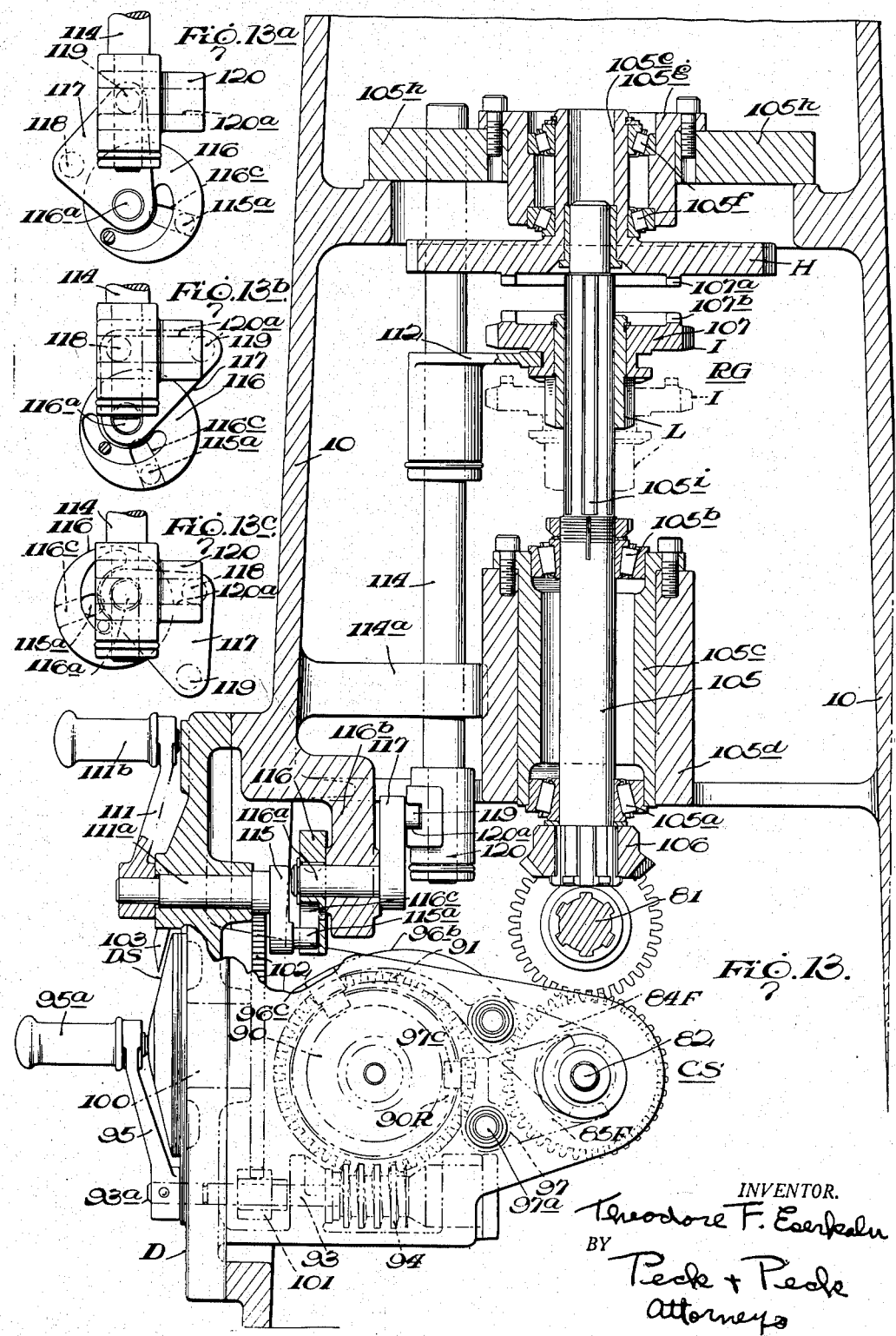

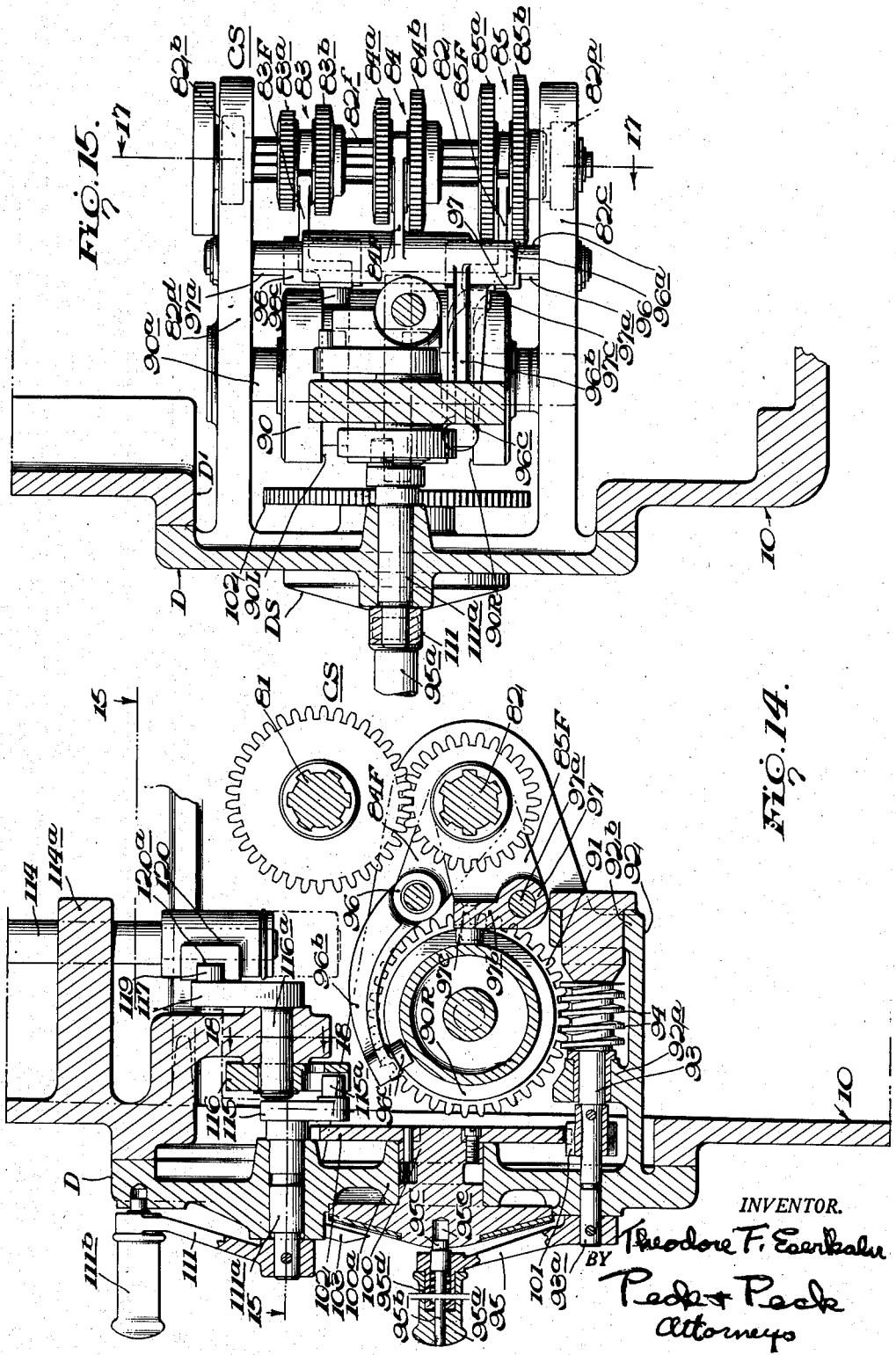

Feb. 24, 1953 T. F. ESERKALN 2,629,293
MACHINE TOOL
Filed May 5, 1948 13 Sheets-Sheet 12
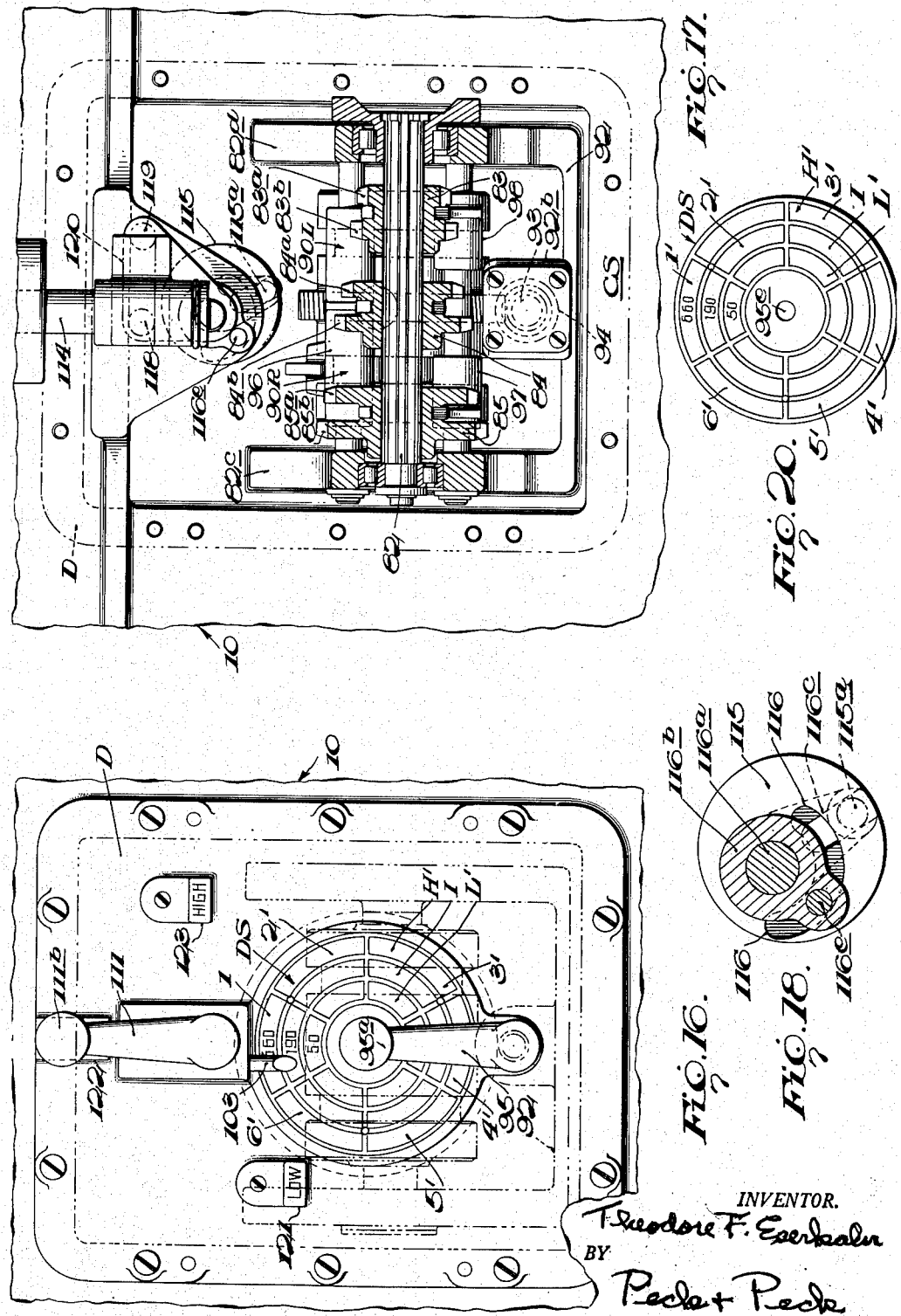

Patented Feb. 24, 1953

2,629,293

UNITED STATES PATENT OFFICE 2,629,293

MACHINE TOOL

Theodore F. Eserkaln, Wauwatosa, Wis., assignor to George Gorton Machine Co., Racine, Wis., a corporation of Wisconsin Application May 5, 1948, Serial No. 25,140

3 Claims. (Cl. 90—16)

The invention relates to machine tools and particularly to such tools of the vertical spindle, milling machine types; and the nature and objects of the invention will be readily understood by those skilled in the arts involved in the light of the following explanation and detailed description of the accompanying drawings illustrating what I now consider to be the preferred embodiments or mechanical expressions of my invention and of the various features thereof from among various other forms, expressions, embodiments, arrangements, modifications, designs, constructions and combinations, of which the invention is capable within the broad spirit and scope thereof, as defined by the hereinafter appended claims.

My invention, while not so limited or restricted, is primarily concerned with those types of milling and the like machines of the high powered classes particularly adapted for heavy duty operations, and which are characterized by a vertical, power driven rotary cutter spindle mounted on and movable as a unit with a vertically movable head which is fed selectively vertically downwardly or upwardly by either a power or a hand feed toward and from the work; and a general object of the invention is to substantially improve the design, arrangement and construction of such vertical spindle types of machine tools and of the associated elements and mechanisms making up the machine in order to increase operating efficiency while maintaining structural and mechanical simplicity of the machine and its various operating mechanisms and providing an arrangement and mounting of such elements and mechanisms which locates them for ready access for removal, replacement, or repair, as well as locating the operating controls for such mechanisms in positions readily visible and accessible to an operator for ease of manipulation.

The invention provides as a unit, a vertically slidably mounted head with a rotary cutter spindle journaled thereon in vertically disposed position; and it is a further object to provide a structurally simple yet strong and rigid construction for such head which readily lends itself to the mounting and journaling of the cutter spindle thereon by an efficient arrangement of bearings so as to insure accurate positioning of the cutter spindle and the maintenance of such positioning under all operating conditions, and further to provide a form of slidable mounting for said cutter spindle head on the frame structure which will position the cutter spindle with its vertical axis in the vertical plane passing through the center of the machine from front to rear and which will maintain the head and cutter spindle confined precisely to such position and to the straight line path of vertical movements thereof so that the possibility under operating conditions of play or lateral displacements of the head and spindle developing in any direction will be reduced to a minimum.

The vertically slidable cutter spindle head unit is, in accordance with the invention, fed upwardly or downwardly by either power or by hand operation of the head feed through the medium of a vertically disposed feed screw rotatably mounted in the machine frame structure held against axial movements; and a further object is to provide a nut member mounted on and carried by the spindle head unit for operative engagement with the feed screw and to so mount and position the feed screw and the head unit nut member actuated thereby that the screw and nut members have their axes aligned and parallel with the vertical axis of the cutter spindle and lie in the vertical plane of the center of the machine frame from front to rear thereof which passes through the vertical axis of the spindle, so that, the forces for raising and lowering the cutter spindle head unit will be applied to that unit by the feed screw and nut member in the vertical plane that passes through the vertical axis of the cutter spindle and the center of the machine frame from front to rear thereof.

A machine of the invention includes a power feed and a hand feed of the gear type for rotating the cutter spindle head unit actuating feed screw in either direction to raise or lower the spindle unit, with the power feed including a selectively operable, three (3) position feed reversing mechanism for causing rotation of the feed screw in either direction and for setting the mechanisms in a neutral position for disengaging the feed from the screw; and a further object is to provide a mechanical interlock between the hand feed and the power feed for selectively engaging and disengaging the hand feed from the power feed in such a manner that the hand feed may be engaged in position for operating the feed screw only when the power feed is set in inactive position disengaged from and in non-driving relation with the power feed by the feed reversing mechanism.

Another object is to provide a multiple position depth stop for selectively setting up and determining the limit of downward movement of the cutter spindle head unit, particularly when the unit is being power fed, which depth stop will be of a design and arrangement having inherent mechanical simplicity, positive and accurate in functioning and capable of being selectively set up by the operator for a desired depth limit by a minimum of movement and manipulation, and which may be mounted in completely exposed and unobstructed position located entirely at one side of the cutter spindle head unit.

A further object is to provide a power trip mechanism for control by the depth stop for automatically tripping and cutting out the operation of the power feed when the cutter spindle head unit reaches its limit of downward movement as determined by the selected depth position set up by the depth stop.

And a further object is to provide for operation automatically of the power feed trip mechanism by the cutter spindle head unit to cause the trip mechanism to trip out and disengage the power feed when the spindle head unit reaches a predetermined limit of upward movement under power feed.

The invention also provides for power rotation of the cutter spindle selectively at different rates of speed in any vertical position to which the cutter spindle is moved by vertical upward or downward movements of the cutter spindle head unit; and another object is to provide an efficient variable or change speed drive of the gear type utilizing a minimum number of gears with the gears of the drive so mounted and arranged relative to the cutter spindle that the vertical centers of all of the contact zones or areas defining the line of power flow from the source of power to the cutter spindle lie in the same vertical plane passing through the center of the machine frame from front to rear thereof in which the vertical axis of the cutter spindle is located.

A further object is to provide such a power drive for the cutter spindle which will include as components, a change speed gear unit providing a single shift or control point for selectively setting up any one of a series of different speed steps and a set of range gears having a single shift or control point providing a series of basic speed ranges operatively common to the change speed gear unit, so that the drive will offer a wide range of speeds through which the cutter spindle may be rotated by selective control of but two (2) shifting or control points in order to set up any selected speed within the speed range.

A further object is to provide as a unit, a change speed gear and a speed step selector mechanism therefor, which will be of compact, simple mechanical design and arrangement for inclusion in the spindle drive as a component thereof and which may be mounted in a convenient location in a machine frame structure for ready removal and replacement as a unit; and further to so design such unit that a side wall thereof will provide a face plate for location in the adjacent side wall of the frame structure disposed at the exterior thereof and for mounting thereon of the speed selector dial and hand operated selector crank of the selector mechanism.

Another object is to provide the change speed gear unit component of the cutter spindle power drive, as an arrangement of simple compound gear trains by which a maximum number of speed steps are obtainable from a minimum number of gears by forming such gear trains of solely a series of primary or driving gears mounted on a power input shaft and a series of secondary or driven gears mounted on a power take-off or driven shaft for driving connection with the cutter spindle, with the primary gears axially movable on the driving shaft for selective engagement of any one of said primary gears of its secondary gear, and with the secondary gears together providing a substantial weight mass so that the secondary gear will develop a substantial fly-wheel effect acting on the driven shaft.

The speed dial and the manually operable selector crank are located at the exterior of the face plate of the change speed gear unit with the speed indicator dial rotated by manual operation of the selector crank; and a further object is to so co-relate the selector crank with the speed indicator dial and to so synchronize the revolutions of the hand crank to the resulting revolutions of the dial that upon the completion of each speed step setting of the dial by the selector crank, the outer free end of the crank will be located in position opposite the axis of the dial and may be releasably latched into the center of the dial to hold the crank in an adjusted, selected speed indicating position.

Another object is to provide an efficient selectively operable feed range shifter mechanism for setting up the selected speed range for the drive independently of the operation of the change speed step selector mechanism, and to so design, arrange and mount the range selector mechanism that the manually operable selector crank thereof may be mounted in position in and located at the exterior of the face plate of the change speed unit adjacent the selector crank on that unit to thus position the operator controls for both the change speed gear unit and the range gears at the same location for ease and efficiency of selective operation in setting up any desired spindle speed.

And a further object is to provide a design and arrangement of the range gear shifter and selector mechanism in which that mechanism is releasably locked automatically in each of its positions of adjustment solely by the action of the gravitational forces on the mechanism.

With the foregoing objects, features and results as well as certain others in view, which others will be readily apparent from the following detailed description and explanation, my invention consists in certain novel features in design and construction of parts and elements in various combinations and sub-combinations thereof, all as will be more fully referred to hereinafter.

Referring to the accompanying drawings in which similar reference characters refer to corresponding parts and elements throughout the several figures thereof:

Fig. 2 is a view in side elevation of the left hand side of the machine of Fig. 1, showing particularly the speed indicator dial and the speed step selector hand crank and the range speed selector hand crank, both located on and at the exterior of the face plate of the change speed gear unit.

Fig. 3 is a vertical section taken longitudinally or from front to rear of the machine of Figs. 1 and 2, through the lower portion of the column structure and the power transmission and change speed gear unit of the spindle drive mounted in such portion of the column structure.

Figure 1:
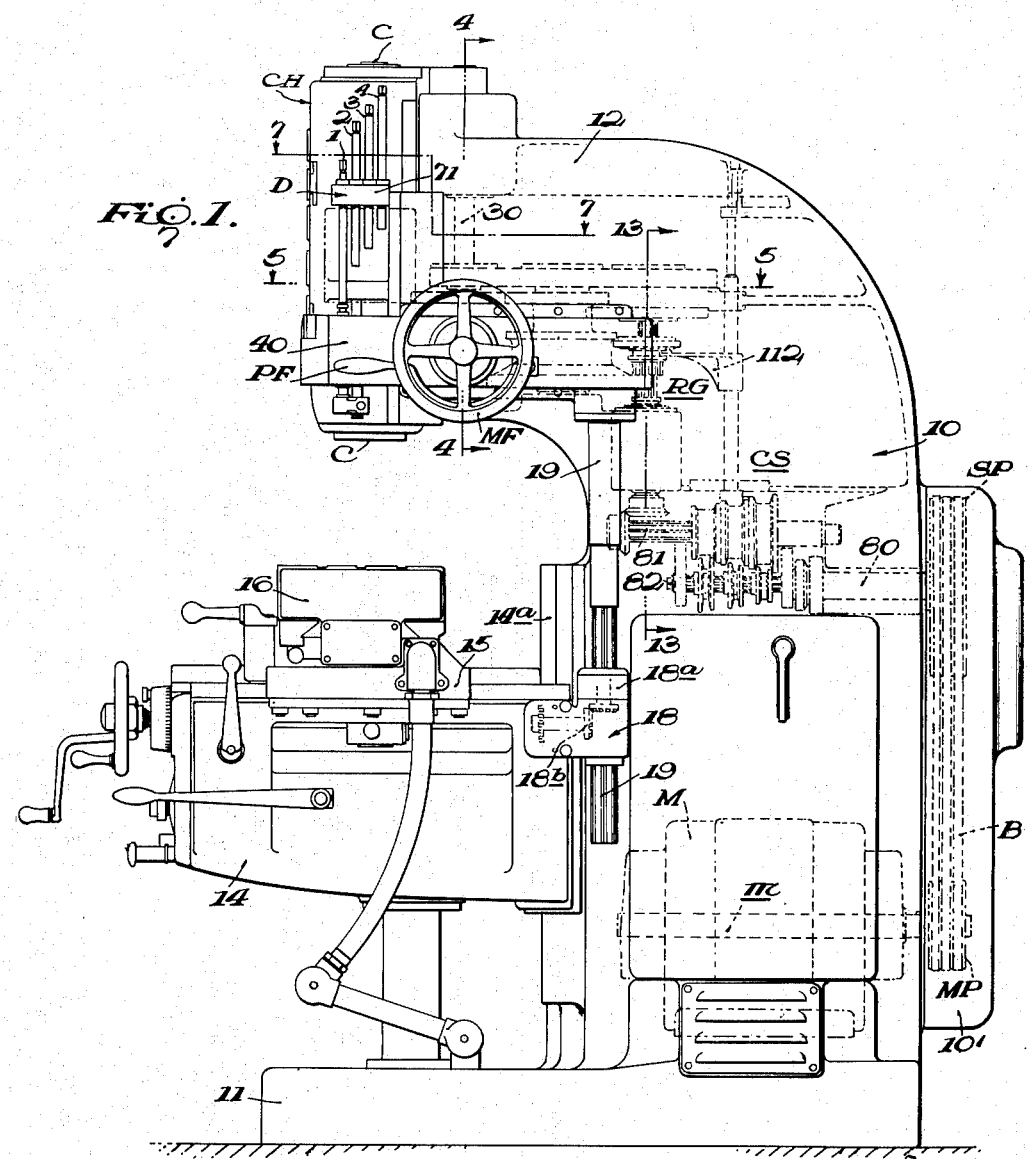
Fig. 1 is a view in side elevation of a vertical spindle milling machine embodying the various features of my invention, taken as from the right hand when facing the machine, and with portions of the power transmission and of the variable speed drive from the power transmission to the cutter spindle being shown in dotted lines.

Fig. 5 is a horizontal section taken as on the line 5—5 of Fig. 1, through the upper end portion and overarm of the column structure of the machine above and showing the gear trains, including the range gears, from the change speed unit of the spindle drive to the cutter spindle, the housing and manual controls for the spindle head unit feed and the reversing and power trip mechanism being both shown in top plan, with the latter mechanism located within the housing being shown in dotted lines.

Fig. 6 is a top plan view of the cutter spindle head unit in mounted position on the forwardly extended head or overarm portion of the machine column, the forward portion only of said overarm being shown.

Fig. 7 is a horizontal transverse section through the cutter spindle head unit and the slidable mounting thereof on the forward wall of the machine column overarm, the forward portion only of the overarm being shown and the section having been taken as on the line 7—7 of Fig. 1.

Fig. 8 is a view in side elevation of the cutter spindle head feed reversing and power trip mechanism, the outer side wall of the housing therefor having been removed.

Fig. 9 is a vertical transverse section taken as on the line 9—9 of Fig. 8.

Fig. 10 is a vertical transverse section taken as on the line 10—10 of Fig. 8.

Fig. 11 is a vertical transverse section taken as on the line 11—11 of Fig. 8.

Fig. 12 is a view in front elevation of the cutter spindle head unit with the multiple position depth stop mounted on and carried by the unit and with the forward end of the housing for the power feed reversing and trip mechanism being shown in elevation.

Fig. 12a is a detailed view in top plan of the stop rod carrying quadrant plate of the depth stop mechanism.

Fig. 13 is a vertical, transverse section taken through the machine of Fig. 1, as on the line 13—13 of Fig. 1, the change speed gear unit of the spindle drive being shown in side elevation and the range speed selector mechanism and certain of the range gears being also shown partly in elevation and partly in vertical section.

Figs. 13a, 13b and 13c, are detailed views in side elevation showing the high, intermediate, and low speed range selection positions, respectively, of the shifter arm of the range gear shifting and selector mechanism.

Fig. 14 is a view in vertical, transverse section through the change speed gear unit and a portion of the speed range selector mechanism, with the unit in mounted position in the machine column structure.

Fig. 15 is a view in horizontal section through the portions of the machine column in which the change speed gear unit is mounted, being taken as on the line 15—15 of Fig. 14, and showing in top plan the change speed gear unit and range gear selector mechanism in mounted position.

Fig. 16 is a view in front elevation of the face plate of the change speed gear unit in mounted position in the machine column, with the speed selector hand crank and speed indicator dial thereof and the speed range selector hand crank thereon, being also shown in front elevation.

Fig. 17 is a vertical section taken as on the line 17—17 of Fig. 15, through the change speed gear unit, the selector crank operated range gear shifter arm being also shown in rear elevation.

Fig. 18 is a detailed view in transverse section taken as on the line 18—18 of Fig. 14.

Figure 19:
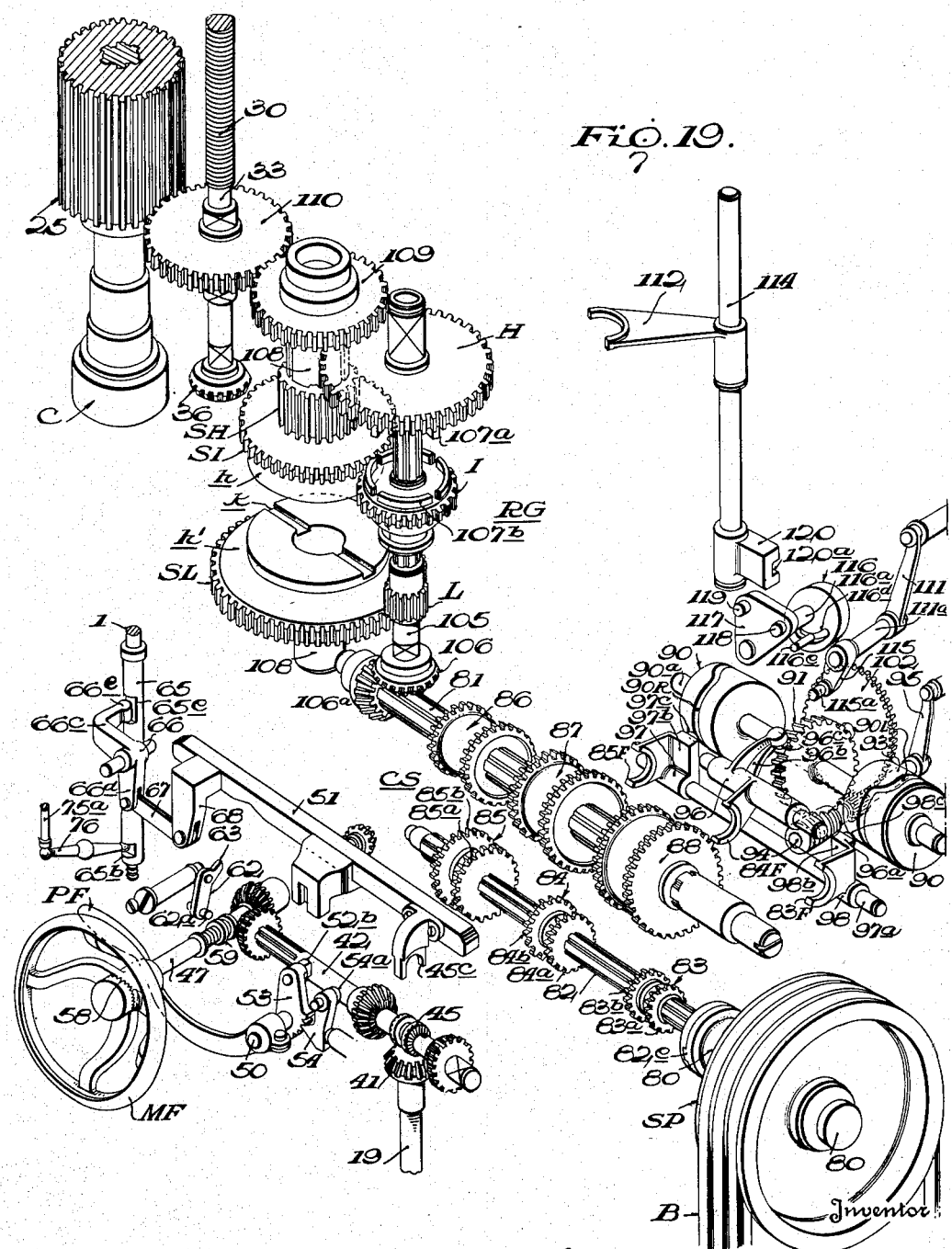

Fig. 19 is a perspective view more or less schematic of the cutter spindle drive, including the change speed unit with its speed step selector mechanism and the range gear organization with the speed range selector mechanism; the cutter spindle manual feed and the head power feed, and power trip mechanism, all of the elements of the foregoing being shown as though separated and pulled apart but maintained in their general positions relative to and for operative association with each other.

Fig. 20 is a front elevation of the speed step indicator dial of the speed step selector mechanism.

A milling machine embodying and incorporating therein the various features of my invention to provide a design of such a machine of the column and knee type having a vertical cutter spindle, particularly adapted as a machine for heavy duty production classes of milling, has been selected and is illustrated and described herein as an example for purposes primarily of describing and explaining the features and advantages of and the results attained by the invention. It is not intended by this illustrated example to limit or restrict the invention or its various features to the column and knee type of milling machine or to high powered milling machines, such as the machine of the example, designed and constructed to meet the structural, mechanical and functional requirements for heavy duty production classes of milling work, as various features of the invention have utility and will be of advantage for milling machines of various power ratings and for wide classes of milling operations. Further the invention contemplates and includes adaptations and embodiments of the various features thereof, not only to milling machines but to machine tools generally where such tools include a rotary cutter spindle to be power driven selectively at different rates of speed from a power point on the machine removed or remote from the cutter spindle, and where the cutter spindle and work support or table have relative movements toward and from each other. In addition, certain features of the invention such for instance, as presented by the change speed gear unit; the selectively operable speed range gears; and the speed selector and shifting mechanisms for the change speed unit and the range gears, have wide and general adaptability as speed changing units or organizations in any power drives or transmissions for other machines or purposes.

*General organizaton of the example machine*

The vertical spindle, column and knee type milling machine of the selected example, referring now to Fig. 1 of the drawings in particular, includes a column structure 10 supported upon and extending upwardly from a forwardly extended base 11, with the upper portion of column 10 formed to provide or provided with a forwardly extended, horizontally disposed overarm or head portion 12.

A knee 14 is mounted and supported at the forward side of column 10 spaced below the overarm or head portion 12 for vertical movements upwardly or downwardly along a straight line path, the inner or rear vertical side of knee 14 being vertically slidably engaged in a suitable vertically disposed slideway 14a at the forward side of the column. A saddle 15 is slidably mounted on the upper side of knee 14 for the usual in and out or transverse movements thereof along a straight line path on the knee. A work table 16 is slidably mounted on the upper side of the saddle 15 for horizontal movements thereon in either direction along a straight line path perpendicular to the path of transverse movements of saddle 15 on knee 14, for the usual so called longitudinal movements of the work table. Such knee, saddle and work table assembly and the mounting thereof on and relative to column 10 and its overarm or head portion 12, may be considered to be broadly conventional for purposes of this description, as the knee, saddle and table form no part of the invention to be herein disclosed, described and claimed. The knee 14, saddle 15 and work table 16, in the example hereof, are power fed from a motor 17 mounted on and carried by the knee 14. The motor 17 through the power feeds driven thereby forms also the source of power for feeding the cutter spindle carrying head unit of the example machine of this invention, but except as a source of power for feeding such unit, the power feeds per se for the knee, saddle and table, form no part of my present invention to be herein disclosed, described and claimed, and hence, it is not deemed necessary to make detailed disclosures of such knee, saddle and table feeds herein. For purposes of the present example, these feeds may be taken to be a suitable conventional or other power feed usual for this purpose.

A power take-off assembly 18 is mounted on one side, in this instance the right hand side, of the knee 14, adjacent the rear of the knee, this assembly 18 being extended rearwardly from the knee to a position located at one side of column 10. Power take-off assembly 18 includes a driving member 18a journaled for rotation therein about a vertical axis and having a vertically disposed splined bore therethrough. The rotary member 18a is connected in driving relation with and s driven from the power feeds of the knee which are driven by the motor 17 through the medium of suitable gearing 18b, purely schematically indicated in dotted lines in Fig. 1. A drive shaft 19 for the cutter spindle head feed is suitably mounted and journaled in vertically disposed position along the right hand side of column 10 adjacent the front side of the column. The shaft 19 is suitably splined and is received in and extends downwardly through the knee mounted power take-off 18 and the splined vertical bore of the rotary power driven member 18a thereof, in driving connection with such member. Thus, shaft 19 is power driven from the knee mounted motor 17 through the knee carried, power take-off assembly 18, with the rotary driven member 18a of such assembly being vertically slidably engaged in driving connection with shaft 19, so that member 18a is maintained in continuous driving connection with shaft 19 in all positions of vertical adjustment of knee 14, as well as during vertical upward and downward movements of the knee between adjusted positions.

A cutter spindle head unit CH is mounted at the forward, vertical front side of the overarm or head portion 12 of column 10 in position above work table 16 for vertical movements upwardly and downwardly along a straight line path from and toward the work table. This spindle head unit CH includes the vertically movable head H' on which there is mounted and journaled in vertically disposed position, a rotary cutter spindle C for movement upwardly and downwardly toward and from work table 16 with the head H' as a unit. The spindle head unit CH, is fed upwardly and downwardly under power by a reversible power feed driven from the knee motor driven shaft 19, and controlled by a hand lever PF located at the right hand side of overarm 12 and head unit CH. Provision is also made for manual feed of the spindle head unit CH through a hand wheel MF located adjacent power feed control lever PF at the right hand side of the overarm or head portion 12 of column 10.

A multiple position depth stop organization or unit D is mounted on and carried by the spindle head unit CH, being in this instance mounted at the right hand side of the head unit for vertical upward and downward movements therewith. The depth stop D selectively controls the limits of downward movement of head unit CH under power feed by tripping out automatically the power feed of the head when the selected downward movement of head unit CH is attained. This depth stop organization D also provides for controlling and determining the limit of upward movement under power feed of the cutter spindle head unit CH, by tripping out the power feed when the head CH is power fed vertically upwardly to a predetermined limit.

The rotary cutter spindle C mounted and journaled on and forming with the head H' the vertically movable spindle head unit CH, is power driven by a power transmission or drive which is independent of the power feed from knee mounted motor 17 of the spindle head unit CH and which is driven from a source of power separate and independent from the knee mounted motor 17 which provides the power for the head feed. In this instance, a motor M, referring to Fig. 1, for driving the cutter spindle C, is mounted and housed within a motor compartment or chamber provided by the lower end of column structure 10. This motor M is, in this instance, of relatively high horse power to meet the working requirements for which the example machine was designed and is intended, so that motor M is of necessity of relatively large dimensions. The length of the motor M is greater than the width of column 10 at the motor compartment forming lower portion of the column, but this length does not exceed in this example the length, that is the front to rear horizontal dimension, of column 10, so that motor M is mounted and completely contained in the column in position disposed lengthwise of the greatest horizontal dimension of the column with the motor shaft $m$ disposed horizontally and extending from front to rear of the column 10.

A change speed power transmission or drive is provided for operatively connecting motor M into driving relation with the cutter spindle C, motor M being preferably of the reversible type in order that cutter spindle C may be selectively driven in either direction of rotation by the drive. The power drive from motor M to cutter spindle C, includes a change speed gear unit CS providing a series of different speed steps together with an operator controlled speed step selector mechanism therefor. The change speed gear unit CS is driven from motor M through a suitable power transmission and in turn drives the cutter spindle C through a selectively operable range gear organization or unit which provides a series of different speed ranges. This range gear organization is generally identified in Fig. 1 by the reference character RG. Range gear organization RG is provided with and includes a suitable range gear selector mechanism for operation to selectively set up any desired one of the speed ranges provided by the organization, as will be hereinafter described and explained.

The column structure 10 with the overarm or head portion 12 thereof, is of hollow, general box like construction and of generally rectangular cross section with the greatest horizontal dimension disposed from front to rear of the machine. This same general cross sectional shape is followed out by the forwardly extending, horizontally disposed overarm or head portion 12. The column structure 10 is preferably formed of a casting or of several castings suitably joined together as by welding or the like, and is designed to afford maximum strength and rigidity for the machine while maintaining weight and overall dimensions within the minimum practical limits considering the power of the machine. For example, in carrying out this objective various strengthening ribs, webs, flanges and partitions may be cast integrally with the column structure and disposed within the interior thereof in an arrangement which will give maximum internal space for mounting and efficiently arranging within the column the various units and mechanisms of the machine, as will be hereinafter referred to in the detailed description of the various mechanisms and units of the machine and of the mounting thereof in the column structure. As will appear hereinafter, certain of such internal strengthening structure of the column is also designed to enable the mounting and supporting in the column of various elements of the mechanisms of the machine in an efficient arrangement thereof relative to the column structure and to the space available therein.

*The cutter spindle head unit and the slidable mounting therefor*

Figure 3A:
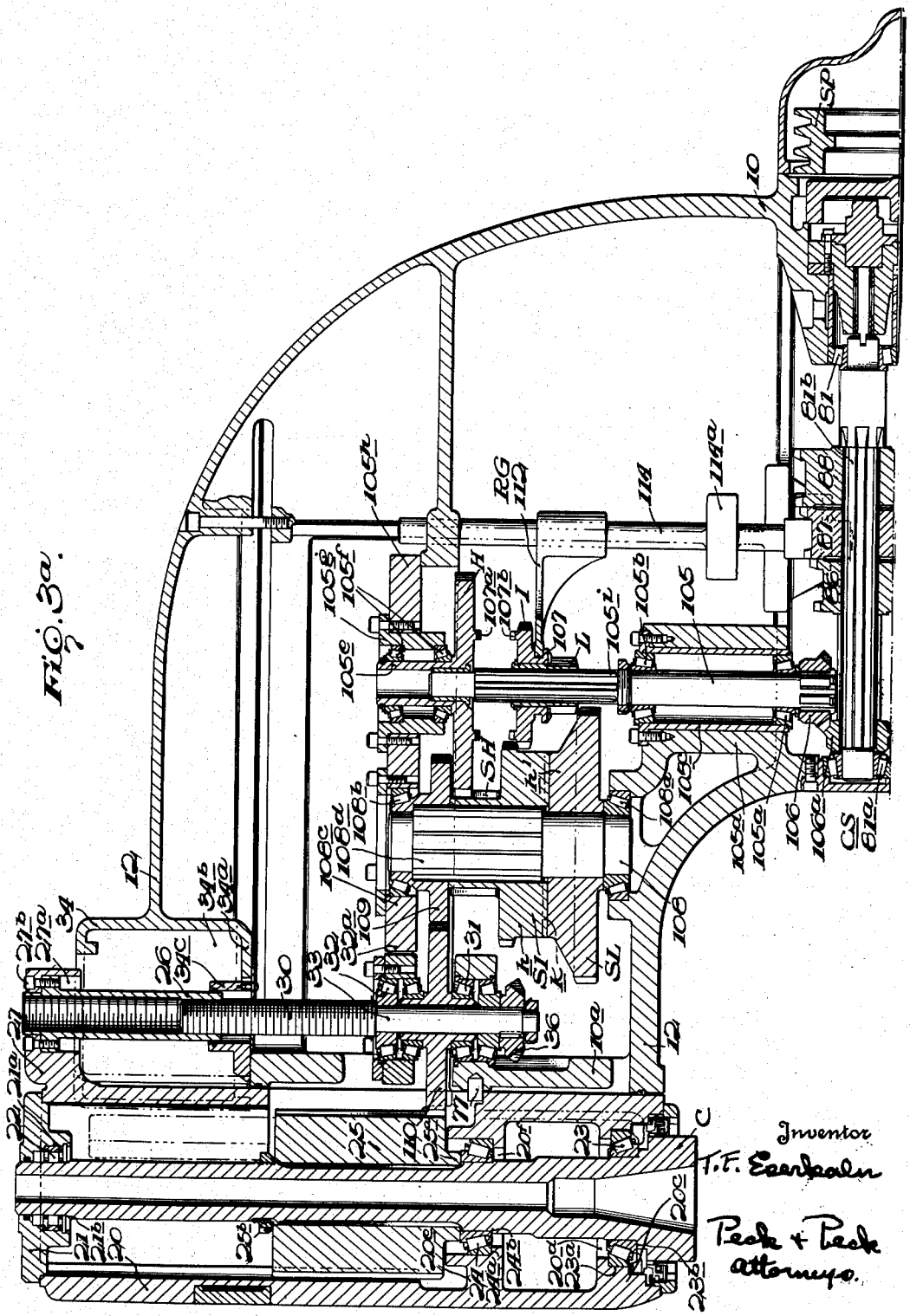
Fig. 3a is a vertical section taken longitudinally of the machine, through the upper portion of the machine column and through the vertically movable cutter spindle head unit, the head unit feed screw and the spindle drive from the change speed gear unit to the cutter spindle on the spindle head unit.

The vertically movable cutter spindle carrying head unit CH, referring now to Figs. 3a, 5 and 7, in connection with Fig. 1, includes the hollow, elongated casting or the like structure 20, which has a length or vertical depth approximately equal to and preferably not exceeding the height or depth of the forward or front vertical wall 10a of the overarm or head portion 12 of column structure 10 (see Figs. 1 and 3a). This head H'' is slidably mounted and confined in vertically disposed position on the front wall 10a of overarm 12 with its longitudinal or vertical axis perpendicular to the horizontal plane of work table 16, for movements upwardly and downwardly along a straight line path from and toward the work table. In this particular example, the slidable mounting of head H'' on the vertical front wall of overarm 12 is carried out, referring now to Figs. 5, 6 and 7, by providing a vertically disposed, relatively wide, straight walled groove forming a slideway 10b in and extending centrally of the overarm front wall 10a. This slideway 10b extends throughout the vertical length or height of overarm front wall 10a between the upper and lower sides thereof, except that the inner or rear wall of the slideway is centrally cut away downwardly from and opening through the upper side of wall 10a to provide a vertically disposed slot or space 10h for receiving and permitting unobstructed vertical movements with head H'' of a rearwardly extending structure mounted at the upper end of the head, as will be referred to hereinafter. Slideway 10b is of substantial depth horizontally, that is, inwardly of wall 10a, and has the forward portion thereof opening through the front surface of wall 10a, of increased width to provide the spaced slideways 10c at and vertically along opposite sides of the inner smaller width slideway 10b. Both the slideway 10b and the slideways 10c which extend laterally from opposite sides thereof, are of generally rectangular shape in cross section and each is preferably constant in width and depth throughout its vertical length.

The inner or rear vertically disposed side wall of the head structure 20 is provided with a vertically disposed, centrally located and relatively wide rib 20a thereon which extends throughout the vertical length of head structure 20 and which forms a slide designed to be received and slidably seated in the inner, narrower width slideway 10b provided in the front wall 10a of the column overarm 12. The width and depth or thickness of slide 20a is such that it forms an accurate running fit in the slideway 10b. The head structure 20 is also provided at opposite sides thereof adjacent the base of slide 20a, with the laterally outwardly extending and vertically disposed opposite flanges forming the opposite slides 20b which are slidably received and confined with a running fit in the opposite slideways 10c, respectively, of the overarm front wall 10a. The slidable mounting of cutter spindle carrying head H'' on the forward wall 10a of the column overarm 12 is completed by the retaining plates or rails 10d which are removably secured in fixed positions on the front wall 10a, at opposite sides of the head and which extend inwardly over and in slidable engagement with the outer sides of the spaced opposite slides 20b, respectively, of head H''. The inner, vertical edges of the retaining rails 10d are slidably engaged with adjacent complementary surfaces 10e, respectively, formed on head structure 20, as will be clear by reference to Figs. 5, 6 and 7.

The cutter spindle carrying head H'' is mounted on the forward side of the front vertical wall 10a of column overarm 12 for vertical sliding movements upwardly and downwardly thereon in a straight line path perpendicular to the horizontal plane of the work table 16 therebelow. Head H'' is confined accurately to movements along such straight line path by the slide 20a and the slides 20b at opposite sides thereof, engaged in the slideway 10b and the slideways 10c, respectively, while the head is maintained against forward movements from mounted position on and relative to overarm 12 by the retaining rails 10d engaged over slides 20b, respectively.

The design and arrangement of slideways 10b and 10c and the retaining rails 10d, with the slides 20a and 20b slidably received in the slideways, forms a slidable mounting for the cutter spindle carrying head H'' which provides multiple bearing surfaces disposed transversely of the overarm and head assembly for accurately maintaining the head H″ against displacement forwardly and rearwardly and also provides multiple bearing surfaces at opposite sides of the head disposed longitudinally of the assembly to maintain the head in accurately mounted position against lateral displacements in either direction. In addition to serving to initially assemble the head H″ in accurately mounted position, such multiple bearing surfaces also function to reduce friction and wear in use and thus increase the period of time over which operations may be carried out without appreciable wear.

A vertically movable, tapered gib 10f is mounted in the central slideway 10b to form one vertical edge wall thereof. By vertical adjustment of this gib, a proper fit is obtained with the adjacent lateral narrow edge surface of the slideway 10b, as will be clear by reference to Figs. 5, 6 and 7. A locking pin 10g having any suitable actuating mechanism as indicated in 10i in Fig. 5, may be provided for releasably locking gib 10f in any position of vertical adjustment. The opposite vertical narrow side guide edges of the slideway 10b take all lateral loads while the vertical inner surface thereof extending therebetween takes in and out loads only.

*Cutter spindle mounting*

The hollow casting 20 which forms the head H″, mounts and journals in vertical position therein and extending centrally therethrough, the rotary cutter spindle C. Cutter spindle C is mounted and journaled in the casting structure of head H″ by an arrangement of anti-friction bearing units which maintain the cutter spindle in accurately located position with its vertical axis in the vertical plane which passes through the center from front to rear of column overarm 12 and of the head H″ mounted at the forward side thereof. And it is to be here noted that the vertical center of the hereinabove described arrangement of vertical slideways and slides by which the head H″ is slidably mounted on overarm 12, also lies in such vertical front to rear center plane of the overarm.

The hollow head forming casting 20, referring now to Figs. 3a, 5 and 12, is open at its upper and lower ends with the lower end thereof being formed with an inwardly extended, annular flange 20c therearound of substantial thickness providing therethrough, a central, axial cutter spindle receiving opening 20d. A transverse wall or partition 20e is formed within head structure 20 extending across the interior thereof and being provided with a spindle receiving bore or opening 20f therethrough. The wall 20e is located adjacent but spaced a distance inwardly (upwardly) from the lower end flange 20c, being located in a horizontal plane intermediate the center of the length of structure 20 and the lower end flange 20c. The upper end of head forming casting 20 is closed by an end plate or cap 21 secured in fixed position seated on the upper edge of the structure 20 and being formed to provide a central bore or opening therethrough vertically axially aligned with the bores 20d and 20f therebelow for receiving and journaling therein the upper end of the cutter spindle C.

The cutter spindle C is mounted in vertical, central position in head H″ extending through the axially aligned openings formed in the cap 21, partition 20e, and lower end flange 20c, respectively. The upper end of spindle C is rotatably journaled in an annular anti-friction bearing assembly 22 of the radial type which is mounted in the underside of cap 21 concentric with the spindle receiving opening in the cap. This bearing 22 is mounted and secured in an enlarged diameter annular recess 21a formed in the underside of cap 21 with the bearing secured tightly between the shoulder formed around recess 21a by the underside of the cap and an annular shoulder 21b formed on and around the cutter spindle C.

The lower end of the cutter spindle C which is of enlarged external diameter, extends downwardly through the central opening 20d in the lower end flange 20c of head forming casting 20, and is mounted and journaled in an annular anti-friction bearing assembly 23 of the combined radial and thrust type. This bearing assembly 23 is mounted in an enlarged diameter recess 23a formed in flange 20c below the upper portion of the flange with the bearing secured in tightly mounted position between the annular shoulder provided by the flange around the recess 23a and an annular external shoulder 23b formed around cutter spindle C. The portion of the cutter spindle C which extends through the bore 20f of partition 20e of head forming casting 20 is mounted and journaled in an annular anti-friction bearing assembly 24 of the combined radial and thrust type. Bearing assembly 24 is seated and supported at the underside thereof on an inner annular shoulder provided by an enlarged diameter recess 24a formed in the upper side of partition 20e and an annular external shoulder 24b formed around cutter spindle C. The cutter spindle C mounts a drum gear 25 thereon above partition 20e and the bearing assembly 24, drum gear 25 being suitably keyed or splined to the cutter spindle for rotation therewith. Drum gear 25 at the lower side thereof is provided with a depending annular hub forming flange 25a which seats on and around the adjacent, upper side annular edge surface provided by bearing assembly 24. Drum gear 25 is secured on cutter spindle C against axial movements relative thereto by a lock nut 25b. The bearing assembly 24 is tightly secured in mounted position against displacement in the recess 24a of partition 20e between the inner shoulder provided by the recess and the external shoulder 24b of the cutter spindle and the annular hub flange 25a of drum gear 25 seated against the adjacent upper annular edge of the bearing assembly 24.

The bearing assembly 23 for the lower end of cutter spindle C is of the combined radial and thrust type and is designed to take upwardly acting thrust loads of the cutter spindle, while the inner bearing assembly 24 is of the combined radial and thrust type to take downwardly acting thrust loads of the cutter spindle. Thus, the arrangement of bearing assemblies 23 and 24 care for cutter spindle thrust loads acting in either direction, that is, upwardly or downwardly, while at the same time caring for radial loads at the lower end of the spindle. Hence, the bearing assembly 22 in which the upper end of the spindle is journaled, need care for only radial loads to assist in maintaining the precision alignment and mounting of the cutter spindle C. The cutter spindle C has a length and is so mounted that the upper end thereof extends through cap 21 of head H″ but terminates substantially flush with the upper surface of the cap, while the lower end which is of enlarged external diameter, extends downwardly through and a slight distance below the lower end of head H''. The cutter spindle C is formed with the usual axial bore therethrough for mounting and receiving a draw bar (not shown) for actuating any usual milling cutter or other tool mounting chuck or the like, positioned in the expanded diameter lower end portion of the spindle bore, in a manner familiar in this art. Thus, the cutter spindle C is mounted and rotatably journaled in the head H'' against radial or axial movements relative thereto, so as to be vertically movable upwardly and downwardly along a straight line path with the head as a unit as the head is fed upwardly and downwardly in its slidable mounting on the forward wall 10a of the overarm 12 of column 10.

*Power and manual feeds for the cutter spindle head unit*

The cutter spindle head unit CH is controllably fed upwardly and downwardly selectively by either a power feed driven from power shaft 19 or by a manual feed actuated by hand wheel MF.

The vertical feed of cutter spindle CH, either manually or by power, is effected through the medium of a feed screw 30 rotatably journaled in the column overarm 12, in operative engagement with a sleeve nut 26 mounted on and vertically movable as a unit with the head unit CH. Feed screw 30 is mounted in vertical position parallel with cutter spindle C at the forward end of overarm 12 adjacent but spaced to the rear of the overarm front wall 10a and the head unit CH mounted thereon. Feed screw 30 is mounted in position with the vertical axis thereof located in the vertical plane which passes through the vertical axis of cutter spindle C and through the center of the overarm from front to rear thereof. The feed screw 30 is mounted and rotatably journaled in position held against axial movements in the overarm 12 of column 10 by sets of vertically spaced anti-friction bearing assemblies 31 and 32, each set being of the combined radial and thrust type.

Figure 4:
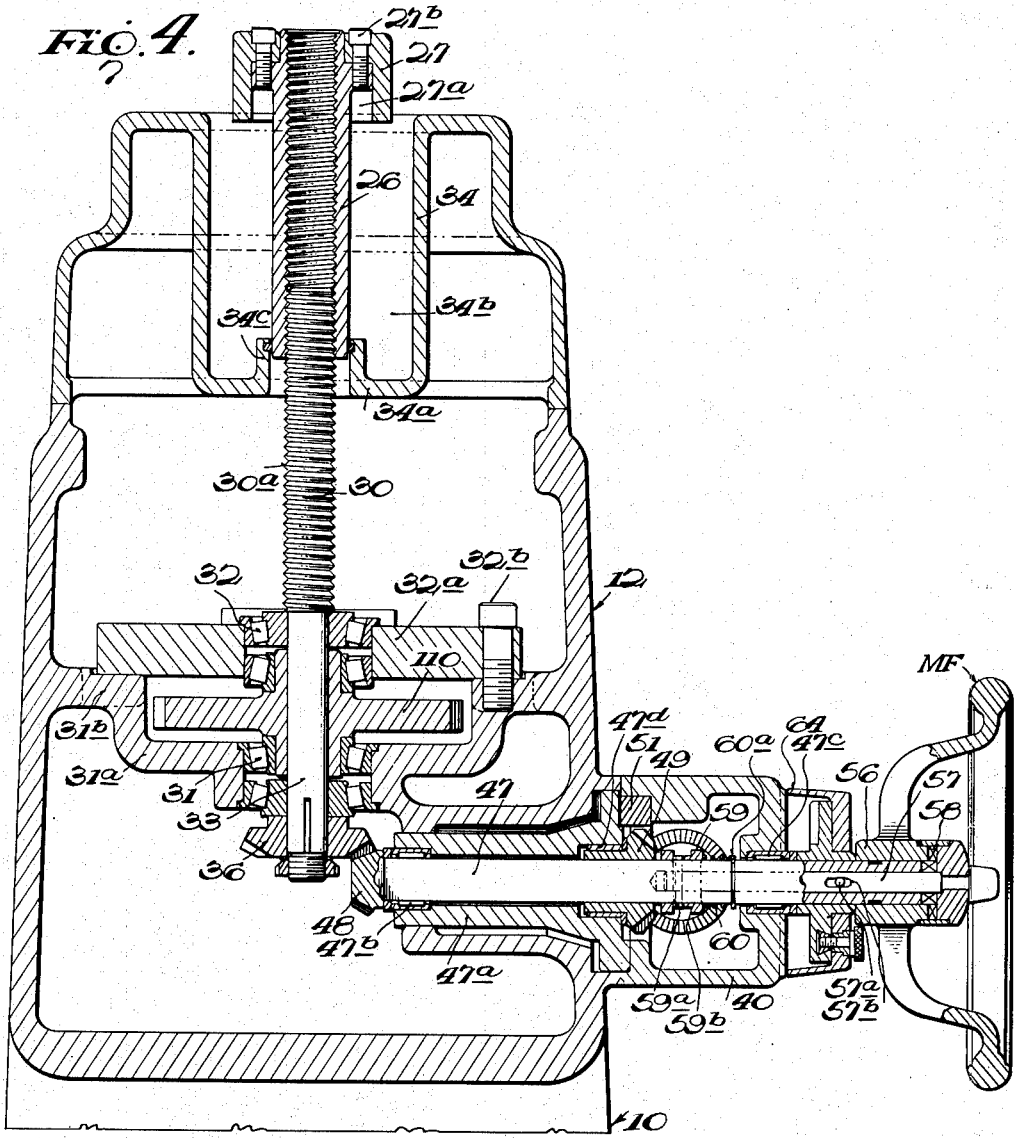
Fig. 4 is a vertical transverse section taken as on the line 4—4 of Fig. 1.

The lower bearing assembly 31, referring now to Fig. 4 in connection with Fig. 3a, is mounted and secured in position in the depressed central portion 31a of a transverse web or partition 31b, extending horizontally across and between the opposite side walls of overarm 12 and forming a portion of the internal, fixed strengthening structure of the overarm. A bearing mounting plate 32a is secured in any suitable manner, as by machine screws 32b, on partition 31b extending over and across and bridging the depressed portion 31a of partition 31b. The bearing assembly 32 is mounted and secured in a central bore or opening in plate 32a in position spaced above and vertically axially aligned with the lower bearing assembly 31.

The lower end section of feed screw 30 is formed of reduced external diameter to provide a smooth surfaced, depending spindle or shank portion 33 which is mounted and journaled in and extends upwardly between and through the vertically spaced bearing assemblies 31 and 32, as will be clear by reference to Figs. 3a and 4. The feed screw 30 extends upwardly in axial continuation of the spindle portion 33 thereof, from the upper bearing assembly 32 upwardly through the overarm 12, being provided with external screw threading 30a thereon for a portion of its length above the upper portion of bearing 32. In this instance threading 30a is formed of a left hand thread.

The front wall 10a of overarm 12 is formed with the vertical opening 10h extending centrally and downwardly therethrough (see Fig. 7), to a depth substantially equal to the maximum range of vertical movements upwardly and downwardly of the cutter spindle head H''. An upstanding wall structure 34 of general U-shape in top plan or arched rearwardly of overarm 12, is provided extending rearwardly from the inner side of front wall 10a at opposite sides of the vertical opening 10h in that wall, to and rearwardly around the upper end length of the feed screw 30. A horizontally disposed lower or bottom wall 34a extends across and closes the lower side of vertical wall 34 to form with that wall a well 34b having an open top through which the upper end of feed screw 30 extends. Wall 34a is formed with an opening therethrough vertically axially aligned with the bearing assemblies 31 and 32 therebelow, and an upstanding annular flange forming a vertically disposed sleeve 34c is provided surrounding and concentric with this bottom wall opening. The sleeve 34c has a greater internal diameter than the external diameter of the feed screw 30 which extends upwardly therethrough (see Fig. 3a).

The feed screw 30 is operatively connected with the cutter spindle head unit CH for moving said head unit upwardly and downwardly by means of a feed screw sleeve nut 26 which is mounted on head unit CH in position in threaded engagement with feed screw 30 for translating the rotary movements of the feed screw into vertical rectilinear or straight line movements of the head CH. In this example, the sleeve nut 26 is internally screw threaded and extends down into well 34b, over and with its internal threading engaged with the external threading 30a of the feed screw, and its lower end extended down into and vertically slidably received with a running fit in the upstanding sleeve 34c on well bottom wall 34a.

The upper end of the sleeve nut 26 is secured and attached in fixed position to a horizontally disposed rearwardly extending arm 27, which arm is fixed and secured to the rear side of the head casting 29 centrally thereof for vertical upward and downward movements with the head H by rotation of the feed screw 30. In this instance the sleeve nut mounting arm 27 is formed with a vertical bore therethrough axially aligned with and receiving the upper end of the feed screw for vertical movements therethrough of the feed screw relative to arm 27. Arm 27 is formed with an annular recess 27a in the underside thereof surrounding and concentric with sleeve nut 26 and feed screw 30, and the upper end of the sleeve nut is positioned in this recess and rigidly attached and fixed to arm 27 by machine screws or the like 27b.

Thus, sleeve nut 26 and its carrying arm 27 are mounted and held against lateral or rotational movements, so that, rotation of the feed screw 30 in one direction will thread sleeve nut 26 upwardly thereon while rotation thereof in the opposite direction will thread the sleeve nut downwardly thereon to thereby raise and lower the cutter spindle head unit CH along its vertical straight line path of movement on its slidable mounting. In Fig. 3a of the drawings, head CH is shown at its limit of upward movement with the cutter spindle C in its maximum raised position. Upon rotation of feed screw 30 in a direction to move head CH downwardly, the sleeve nut carrying arm 27 moves downwardly through the slot or opening 10h in overarm front wall 10a and the well 34, the sleeve nut itself being fed downwardly over feed screw 30 and downwardly through sleeve 34c of the well bottom wall 34a.

The feed screw 30 is power driven from the powered, vertically disposed drive shaft 19 located at the exterior of the right hand side of machine column 10 (see Fig. 1). An elongated, generally rectangular shaped casing or housing 40 is mounted in horizontally disposed position on the exterior of the right hand side of the column overarm. Housing 40 extends rearwardly across drive shaft 19 and forwardly over and across the adjacent side of the vertically movable cutter spindle head unit CH.

The upper end of drive shaft 19 extends upwardly through a journal box formed through the underside of the housing 40 where it is mounted and journaled in suitable anti-friction bearing assemblies 19a (see Fig. 8). The upper end of shaft 19 extends into housing 40 and mounts thereon a horizontally disposed bevel gear 41 for rotation by the shaft. A horizontally disposed shaft 42 is suitably mounted and journaled within and disposed longitudinally of the housing extending rearwardly across the bevel gear 41 at the upper end of shaft 19. Oppositely facing bevel gears 43 and 44 are mounted on shaft 42 spaced apart axially thereof for rotation on and independently of shaft 42. Bevel gears 43 and 44 are located and positioned in mesh at their under sides with bevel gear 41 at diametrically opposite points, respectively, on the latter gear. Thus, rotation of gear 41 by shaft 19 in either direction will always rotate the oppositely facing bevel gears 43 and 44 in opposite directions.

A clutch spool 45 is splined to shaft 42 between the spaced, oppositely rotated bevel gears 43 and 44 for axial movements on and relative to the shaft to positions in clutching engagement with either gear 43 or gear 44, or to a neutral position intermediate and disengaged from both of such gears. The clutch spool 45 is provided at opposite ends thereof with sets of clutch teeth 45a for selective engagement with suitable sets of clutch teeth 43a and 44a, respectively, on the inner sides of the hub portions of these gears. The clutch spool 45 is provided with a shifter fork receiving groove 45b therearound and a shifter fork 45c is mounted engaged in such groove for actuation to selectively shift the clutch spool, in a manner to be hereinafter described. When clutch spool 45 is moved rearwardly into clutching engagement with gear 44, the clutch spool and the shaft 42 are rotated in one direction, and when the clutch spool is moved forwardly out of engagement with gear 44 and into clutched engagement with gear 43, then the clutch spool and shaft 42 are rotated in the opposite direction. When clutch spool 45 is in its neutral, intermediate position disengaged from both gears 43 and 44, the clutch spool and shaft 42 are at rest and out of driving connection with shaft 19 and its bevel gear 41.

Shaft 42 extends forwardly through housing 40 to a position with its forward end located generally opposite the lower end of feed screw 30 within overarm 12. A bevel gear 46 is keyed or splined to the forward end of shaft 42 for rotation by the shaft. The lower end of feed screw 30 has a bevel gear 36, referring now to Figs. 3a, 4 and 5, which is suitably keyed and located thereon for rotation with the feed screw. A cross shaft 47 is mounted in horizontally disposed position extending transversely through housing 40 and overarm 12 to provide for operatively connecting shaft 42 of the power drive with feed screw 30, as well as providing the shaft for manual feed of screw 30 by operation of the hand wheel MF. This cross shaft 47 has the inner length thereof extending through a bearing casing structure 47a formed extending inwardly from the adjacent side wall of overarm 12 with the inner end of the shaft journaled in an anti-friction bearing assembly 47b mounted in casing structure 47a. The outer end of the cross shaft 47 is supported and journaled in an anti-friction bearing assembly 47c mounted in the outer side wall of housing 40. A bevel gear 48 is mounted on the inner end of cross shaft 47 in mesh with bevel gear 36 at the lower end of feed screw 30 for rotating the feed screw by rotation of the cross shaft. A bevel gear 49 is splined or keyed to cross shaft 47 in position thereon in mesh with and driven by bevel gear 46 mounted on the inner end of the shaft 42. Bevel gear 49 in this instance is located on cross shaft 47 for engaging bevel gear 46 at the inner side thereof adjacent the side wall of overarm 12. An anti-friction bearing assembly 47d is mounted in the outer end of the bearing casing structure 47a and provides an intermediate bearing point for the cross shaft 47 and for the bevel gear 49.

Cross shaft 47 extends outwardly a distance beyond the outer side of housing 40 and mounts thereon the hand wheel MF in a manner to be hereinafter described, for manual operation of shaft 47 to feed cutter spindle head CH upwardly and downwardly.

*Operator control of the cutter spindle head power feed*

When the cutter spindle head unit CH is being fed under power, the operator controls the direction of feed, that is, upwardly or downwardly, of the head unit as well as the disconnection of the power feed therefrom, that is, for the neutral inactive position of the power feed, by operation of the hand lever PF to selectively set up the power feed reversing and disconnecting clutch spool 45 on the shaft 42.

Hand lever PF is secured on the outer end of a rock shaft 50 mounted and journaled in horizontal position extending transversely of housing 40 with its axis perpendicular to the axis of shaft 42. Rock shaft 50 extends inwardly across housing 40 spaced below shaft 42, in a location intermediate bevel gear 43 of the feed reversing gears and the bevel gear 46 at the inner end of shaft 42. A slide bar or rod 51 is slidably mounted and confined in suitable guideways in the inner side wall of housing 40 for movements in either direction axially or longitudinally of the bar along a straight line path parallel with the axis of shaft 42. Bar 51 is mounted adjacent the upper side of housing 40 spaced inwardly of the housing from shaft 42 and being disposed in a horizontal plane which is spaced above shaft 42 and the power feed reversing gears 43 and 44. Bar 51 also extends rearwardly to the rear end wall of the housing and forwardly a distance beyond the power feed shaft 47 which connects shaft 42 with the feed screw 30.

A laterally, outwardly extended arm or bracket 52 is mounted and secured on slide bar 51 above rock shaft 50 and is provided at its outer side with a vertically disposed slot or groove 52a therein. A rocker arm or crank member 53 is mounted and secured on rock shaft 50 extending upwardly therefrom with its upper free end provided with a pivot pin 53a which is pivotally engaged in a slide block 52b vertically slidably engaged in the slot or groove 52a of slide bar mounted arm 52. In this manner, slide bar 51 is operatively connected with rock shaft 50 for rotating or rocking such shaft upon reciprocation forwardly and rearwardly of the slide bar 51, and for reciprocation of the slide bar in either direction by rotation of the rock shaft.

The clutch shifter fork 45c for actuating and controlling the clutch spool 45 of the head feed reversing gears 43 and 44, is mounted and secured on the slide bar 51 at a location above the clutch spool with fork 45c depending downwardly over and received in the fork groove 45b of the spool, as will be clear by reference to Figs. 8 and 11 in particular.

The clutch spool 45 in its neutral position as shown in Fig. 5, is disengaged from both gears 43 and 44 of the reversing mechanism with the power driven shaft 19 thus disconnected from driving relation with shaft 42, the bevel gears 43 and 44 being reversely rotated on and independently of shaft 42 in an idling operation. Rearward movement from neutral position of slide bar 51 will thus shift clutch spool 45 into clutched engagement with the bevel gear 44, while forward movement of slide bar 51 from neutral position will move clutch spool 45 into clutching engagement with the forward gear 43, of the reversing gears. In the example machine, the feed screw 39 when rotated counterclockwise feeds the cutter spindle head unit CH upwardly and when rotated clockwise will feed this head downwardly. The power driven shaft 19 is continuously rotated in a clockwise direction, so that, bevel gear 44 is continuously rotated counterclockwise while the opposite bevel gear 43 is continuously rotated clockwise. Thus, to feed the cutter spindle head unit CH upwardly, clutch spool 45 is engaged with bevel gear 44, while to feed the head unit downwardly, clutch spool 45 is engaged with gear 43 of the reversing gears. Clutch spool 45 is rearwardly moved into engagement with gear 44 for up feed of head unit CH by swinging hand lever PF upwardly to rock shaft 50 rearwardly and thus move slide bar 51 and the clutch spool 45 rearwardly. Clutch spool 45 is forwardly moved into clutching engagement with gear 43 to feed said head unit CH downwardly, by downward swinging of hand lever PF to rock shaft 50 forwardly and move slide bar 51 and clutch spool 45 forwardly to engage the latter with gear 43.

A spring loaded positioning dog or pawl 54 is provided for releasably holding slide bar 51 and clutch spool 45 in neutral position and in positions of clutching engagement with bevel gears 43 and 44, respectively. This pawl is pivotally mounted on a pivot pin 54a positioned in the housing 40 to the rear of rocker arm 53 with the pawl swingably depending from pin 54a for movement toward and from the rear edge of rocker arm 53 generally opposite rock shaft 50. Pawl 54 is provided with a forwardly extending, edged nose 54b which has the edge thereof located for engaging the rear edge of arm 53 in the horizontal plane passing through the axis of rotation of rock shaft 50. The rear edge of arm 53 is provided with an upper notch 54u in which nose 54b of pawl 54 is engaged when clutch spool 45 is in rearwardly moved position engaged with gear 44 for up feeding of head unit CH; an intermediate notch 54n which is engaged by the nose 54b of the pawl when clutch spool 45 is in neutral position; and a lower notch 54d which is engaged by the nose of the pawl 54 when the clutch spool 45 in in position moved forwardly into clutching engagement with the gear 43 for down feed of the head unit CH. Positioning pawl 54 is spring loaded and continuously biased forwardly into engagement in the rear edge positioning notches of arm 53 by an expansion spring 55 interposed under compression between the rear side of pawl 54 and fixed structure in the housing spaced to the rear of the pawl.

Interlocking power and manual feed

The hand wheel MF, referring now to Fig. 4 in particular, for manual feed upwardly and downwardly of the cutter spindle head unit CH, is mounted and journaled on the outer end of shaft 47 at the exterior of housing 40 by means of the wheel hub 56. Shaft 47 is formed with an axial bore extending a distance inwardly therethrough from the outer end thereof, and an actuating rod 57 is slidably mounted therein. The outer end of rod 57 is operatively associated with a clutch unit 58 mounted at the adjacent outer ends of shaft 47 and wheel hub 56. Clutch unit 58 when in its engaged, clutching position connects hand wheel MF with shaft 47 and when in disengaged, declutched position releases hand wheel MF from shaft 47, so that the shaft and wheel are independently rotatable relative to each other. The actuating rod 57 is confined and limited to a definite range of reciprocation in and relative to shaft 47 by a transverse pin 57a in shaft 47 extending across the axial bore thereof and through an axially disposed slot 57b formed through rod 57. The arrangement and operative association of rod 57 with clutch unit 58 is such that movement of rod 57 outwardly of shaft 47 operates the clutch unit to declutched position, while inward movement thereof operates the clutch unit to clutched position, or permits hand wheel MF to be clutched with shaft 47, for hand rotation of the shaft to manually feed the cutter spindle unit CH.

An interlock is provided for automatically disengaging clutch unit 58 when the power feed control clutch spool 45 is engaged with either gear 43 or gear 44 of the power feed controlling and reversing gears, and for automatically setting up clutch unit 58 for engagement thereof when clutch spool 45 is in neutral position. In this example, such interlock includes an actuating collar 59 slidably mounted on shaft 47 adjacent bevel gear 49 of shaft 47 and opposite the mating bevel gear 46 on shaft 42, with this collar pinned to actuating rod 57 by a transverse pin 59a extending through diametrically opposite, axially disposed slots 59b in shaft 47. Thus, collar 59 is rotatable with shaft 47 and rod 57 as a unit, being axially movable in either direction with rod 57 independently of the shaft 47. An expansion spring 60 is mounted on shaft 47, interposed under compression between the outer side of collar 59 and a retaining flange or ring 60a on shaft 47 spaced outwardly thereon from the collar. Spring 60 functions to continuously bias collar 59 and the actuating rod 57 connected therewith, inwardly of shaft 47 to operate clutch unit 58 to clutched position connecting hand wheel MF in driving relation with shaft 47.

Hand wheel clutch operating collar 59 is positively mechanically interlocked with the actuating slide bar 51 of clutch spool 45. Referring now to Figs. 5, 8 and 9, in connection with Fig. 4, such interlock comprises a crank arm 62 pivotally mounted on a horizontal, fixed pivot pin 61 spaced forwardly from and above but with its axis perpendicular to the axis of shaft 47. Crank arm 62 depends from pivot pin 61 in vertically disposed position spaced forwardly from collar 59 and shaft 47. At its lower end, crank arm 62 pivotally mounts and carries thereon a shifter fork 62a which extends rearwardly of collar 59 and is slidably received in an annular groove formed around the collar, so that, rocking movement of arm 62 outwardly relative to shaft 47 will move the collar 59 outwardly on the shaft against the inwardly acting forces exerted on the collar by the spring 60, and thus will move clutch actuating rod 57 outwardly to operate clutch unit 58 to its declutched position disconnecting the hand wheel MF from shaft 47. Upon removal of the outwardly acting forces from arm 62, spring 60 will act automatically to force collar 59 inwardly of shaft 47, moving rod 57 inwardly therewith to thus operate clutch unit 58 to position for clutching wheel MF with shaft 47 for rotation of that shaft by wheel MF for manual feed of the cutter spindle head unit CH.

At the upper end of crank arm 62, there is provided a horizontally disposed arm 63 (see Fig. 9), which extends inwardly therefrom into engagement in a suitable camming surface formed or provided at the underside of slide bar 51. When slide bar 51 is in the neutral position shown in Fig. 8, with clutch spool 45 disengaged from both the gear 43 and the gear 44 and the power feed thus disconnected from feed screw 30, arm 63 is moved by the action of spring 60 to upwardly swung position with collar 59 and rod 57 inwardly moved on shaft 47 to actuate clutch unit 58 to clutched position connecting hand wheel MF with shaft 47 for manual feed of spindle head CH by rotation of the feed screw 30. However, when slide bar 51 is moved in either direction along its straight line path from this neutral position, to a position engaging clutch spool 45 with either the gear 43 or with the gear 44, then arm 63 is cammed or forced downwardly by bar 51 to rock the crank arm 62 outwardly and thus move rod 57 outwardly to positively operate clutch unit 58 to declutched position disconnecting the hand wheel MF from shaft 47, so that this shaft is then rotated during power feed thereof by shaft 42, independently of and without causing positive rotation or spinning of the hand wheel MF.

A micrometer dial 64, which for purposes of this example may be considered to be a more or less conventional form of such a dial, is mounted on shaft 47 between the outer side of housing 40 and the inner end of hub 56 of hand wheel MF, for functioning in the usual manner.

Automatic power feed trip

Mechanism is provided for operation automatically by the cutter spindle head unit CH for tripping out and disconnecting the power feed to the head unit at a predetermined point in the path of upward movement and at a predetermined point in the path of downward movement of the cutter head unit.

Such trip mechanism includes an actuating plunger 65 mounted in vertically disposed position extending through the housing 40 adjacent the forward end thereof at the inner side of the housing. Plunger 65 is vertically slidably mounted in vertical, axially aligned bores formed through the upper and lower walls respectively, of casing 40, with the plunger being extended a distance upwardly above the upper wall to provide at its upper end a head forming contact button 65a and being also extended a distance downwardly below the lower wall to provide a contact end 65b. The lower portion 65c of the plunger 65 which extends downwardly through the lower wall of the housing is formed of reduced external diameter. The upper portion of the plunger receiving bore formed through the lower wall, is formed of greater internal diameter than the external diameter of plunger portion 65c so as to form an annular recess therearound in which there is mounted an expansion spring 65d engaged under compression between the casing wall at the inner end of the enlarged diameter bore and the annular shoulder formed by the lower end of the large diameter portion of the plunger. The expansion spring 65d continuously biases upwardly the plunger 65 and normally acts when unloaded to maintain the plunger 65 in its normal raised position on the housing 40.

Plunger 65 is operatively coupled with slide bar 51 for moving that bar rearwardly upon downward movement of plunger 65 and for moving the bar 51 forwardly on upward movements of the plunger. Such coupling mechanism may, as in the example hereof, include a bell crank lever 66 pivotally mounted for swinging on a horizontally disposed pivot pin 66a secured in and extending transversely of and across housing 40 in the space between the forward end of slide bar 51 and the actuating plunger 65. This bell crank 66 includes a depending, vertically disposed arm 66d and a forwardly extended, horizontally disposed arm 66c. The forwardly disposed, horizontal arm 66c of bell crank 66, referring now to Fig. 8, is formed or provided at the outer end thereof with a laterally, inwardly extended finger 66e. The depending arm 66d is pivotally coupled by a link 67 to the lower end of a depending, vertically disposed arm 68 which at its upper end is rigidly fixed to and movable with slide bar 51, as will be clear by reference to Fig. 8.

The plunger 65, referring to Fig. 8, is provided with a transverse slot 65e therein opening through the side thereof facing the inwardly extended finger 66e of bell crank arm 66c, with the inner end of this finger extended into the slot. The vertical width or height of slot 65e is greater than the vertical thickness of the end of finger 66e positioned therein and provides an upper contact shoulder 65f for engaging the upper side of the finger end and a lower contact shoulder 65g for engaging the underside of the finger end. (See Fig. 8.) In the normal, inactive position of plunger 65, as shown in Fig. 8, and with the clutch spool 45 in neutral position, the end of finger 66e of bell crank arm 66c is positioned in slot 65e intermediate and spaced from both the upper contact shoulder 65f and the lower contact shoulder 65g of slot 65e in the plunger.

When clutch spool 45 is moved rearwardly by upward rocking of the power feed control lever PF, to position engaging the clutch spool with the gear 44, the bell crank 66 is rocked in a direction to lower or depress finger 66e to a position in contact with or immediately adjacent the lower contact shoulder 65g of plunger 65. In such engaged position of clutch spool 45 and gear 44 with power on, the cutter spindle head unit CH will be power fed upwardly, hence, upward movement of plunger 65 will rock finger 66e upwardly to move slide bar 51 and the clutch spool 45 forwardly to neutral position disengaged from gear 44. As the upward feed is under power, immediately clutch spool 45 becomes disengaged from gear 44, rotation of feed screw 30 stops and upward feed of the head unit CH is arrested. The forward movement of slide bar 51 rocks crank arm 53 forwardly and the positioning pawl 54 snaps from positioning notch 54u into positioning notch 54n of crank arm 53, to thereby releasably retain the clutch spool and the trip mechanism in neutral position.

Conversely, when clutch spool 45 is moved forwardly from neutral position by downward swinging of the power feed control lever PF, to position engaging the clutch with gear 43 on shaft 42, the bell crank 66 is rocked in a direction to raise finger 66e thereof to a position in contact with or immediately adjacent the upper contact shoulder 65f of plunger 65. With clutch spool 45 and the gear 43 thus engaged, and with power on, the cutter spindle head unit CH will be power fed downwardly, hence, under such conditions of operation, downward movement of plunger 65 will rock finger 66e downwardly to move slide bar 51 rearwardly to neutral position disengaged from gear 43. As the downward feed of head CH is under power, immediately upon disengagement of clutch spool 45 from gear 43, rotation of feed screw 30 stops and downward feed of head unit CH is arrested. The rearward movement of bar 51 rocks crank arm 53 rearwardly and the positioning pawl 54 snaps from the positioning notch 54d in which it had been seated for down feed, into the neutral positioning notch 54n of crank arm 53 to thereby releasably retain the clutch spool and the trip mechanism in neutral position with the power disengaged and inactive.

It will be noted also that positioning pawl 54 and the positioning notches 54u, 54n and 54d on crank arm 53 also function to aid the operator in swinging hand lever PF into positions setting the feed reversing and neutralizing mechanism in its up feed, down feed and neutral positions, respectively.

*Multiple position depth stop*

The cutter spindle head unit CH mounts at one side thereof, in this instance the right hand side, a multiple position depth stop unit D located above the forward portion of housing 40 and the power feed trip mechanism actuating plunger 65, as will be clear by reference to Fig. 1. This depth stop unit D is mounted on and carried as a unit with the cutter spindle head unit CH, so that, it is moved upwardly in a direction away from plunger 65 as head CH moves upwardly and is moved downwardly in a direction toward the plunger as head CH is fed downwardly.

Depth stop unit D, referring now to Figs. 5, 12a and 12, in connection with Fig. 1, includes a bracket body or barrel 70 (see Fig. 12) mounted in vertically disposed position on and between vertically spaced upper and lower ears or lugs 70a and 70b, projecting laterally in horizontally disposed position from the right hand side of head H″ of the cutter spindle head unit CH. The bracket body 70 is mounted and supported on and between the lugs 70a and 70b for rotation thereon about a vertical axis.

Adjacent the upper end of bracket body 70 and immediately below mounting lug 70a, the bracket body is provided with a radially disposed outwardly and horizontally extending quadrant plate 71 having its outer edge 71a thereof lying approximately in and defining the arc of a quadrant of a circle generated about the vertical axis of rotation of bracket body 70 as a center. The quadrant plate 71, referring to Fig. 12a, is provided in this instance with a series of four (4) vertical, internally threaded bores 71b formed therethrough, spaced equidistant apart along and adjacent the arcuate outer edge 71a of the quadrant plate with these bores so positioned that the vertical axes thereof are located in the arc of the quadrant of a circle generated about the vertical axis of rotation of the quadrant plate and its bracket body 70 as a center. The radial distances between the vertical axis of rotation of bracket body 70 and the vertical axes, respectively, of the internally threaded bores 71b in the quadrant plate 71, is such that horizontal swinging of plate 71 in either direction, forwardly or rearwardly, about its vertical axis over and across the plunger 65, will successively align the vertical axes, respectively, of the bores with the vertical axis of plunger 65.

A series of four (4) externally threaded stop rods 1, 2, 3, and 4, are threaded into and downwardly through the four (4) internally threaded bores 71b, respectively, of quadrant plate 71. These stop rods 1, 2, 3, and 4 are identical in this example, and are interchangeably mounted in the bores 71b. Each stop rod is externally screw threaded substantially throughout its length and is formed at its upper end with a suitable squared head 71c providing wrench flats for engagement by a wrench or other turning tool for rotating the rod to adjust the same vertically upwardly or downwardly in its bore, as well as for use in threading the rod into or from its receiving bore 71b. Upper and lower lock nuts 71d are provided on each of the stop rods 1, 2, 3, and 4, at the upper and lower sides, respectively, of quadrant plate 71 for threading on each rod into releasable engagement with the upper and lower sides of the plate in order to lock the stop rod against inadvertent displacement from a vertically adjusted position. It so happens in this instance, that stop rod 1 is mounted at the forward bore 71b of quadrant plate 71, with rods 2, 3 and 4 being mounted in the successive rearward bores 71b, respectively, of the series.

Thus, by swinging quadrant plate 71 forwardly or rearwardly, any selected one of the stop rods 1, 2, 3, and 4 can be positioned above and in vertical axial alignment with the actuating plunger 65 of the power feed trip mechanism. As the depth stop unit D and the stop rods 1, 2, 3 and 4, thereof are positioned above plunger 65 it follows that the plunger is engaged by a selected stop rod only upon downward feed of the cutter spindle head unit CH so that these stop rods automatically control and actuate the power feed trip mechanism to stop downward feed of the head unit CH. The stop rods 1, 2, 3 and 4 are adjusted in the quadrant plate 71 with their lowered plunger engaging ends located at different distances below the quadrant plate, as will be clear by reference to Fig. 1. The forward stop rod 1 is adjusted and set to depend the greatest distance below quadrant plate 71, with the rearwardly spaced rods 2, 3 and 4 being adjusted to depend successively lesser distances, respectively, below the plate. By this vertical adjustment arrangement of the stop rods 1, 2, 3 and 4, the quadrant plate 71 may be swung forwardly from position with stop rod 1 aligned for engagement with plunger 65, to selectively position any one of the rods 2, 3 or 4, respectively, in alignment with the plunger, with those of the rods positioned forwardly of the selected rod being always the rods depending the greatest distance or distances below segment plate 71, swung to positions by the plate clear of the plunger 65 and of the housing structure 40, so that, these rods may be lowered with the head CH without interference to permit the selected rod to engage the plunger.

A spring loaded positioning pin 72 is vertically slidably mounted in the upper end of bracket body 70 and extends upwardly from the upper end thereof for selectively engaging any one of a series of recesses 72a, referring now to Fig. 5, provided at the underside of mounting lug 70a for releasably receiving and seating pin 72 in each of the four (4) positions of adjustment of segment plate 71, to align the respective stop rods 1, 2, 3 and 4 with plunger 65.

Each of the stop rods 1, 2, 3 and 4, is adjusted to a position such that when swung by plate 71 into vertical alignment with plunger 65, it will engage the plunger and trip out the power feed when head CH has been fed downwardly a distance to have moved the milling cutter or other cutting tool (not shown) relative to work table 16 and a work piece (not shown) thereon to a predetermined depth. Thus, the operator by adjusting the stop rods to different positions can provide different predetermined depths at which power feed downwardly of cutter head CH can be stopped by automatically tripping out and disconnecting the power feed. Selection of that stop rod for the predetermined depth is readily and easily made by the operator by merely swinging quadrant plate 71 forwardly or rearwardly to position aligning the proper stop rod with the plunger 65 of the automatic trip mechanism. By mounting and concentrating the series of stop rods within the quadrant of a circle and by locating and positioning this concentration of rods at one side of the cutter spindle head completely out of the way of the cutter spindle head unit CH, an extremely simple and compact depth stop unit is attained. The arrangement provides a more stable and secure mounting of the depth stop unit on the head CH as the stop rods do not have to clear around the pivot center of the mounting bracket. And further, the degree of movement required to bring any selected stop rod of the series of rods into aligned position with plunger 65 is a minimum, while complete visibility and accessibility for manual manipulation by the operator are obtained by the arrangement.

While in this example, four (4) stop rods are shown mounted on the quadrant plate 71 of the unit D, the invention is not limited to this particular number, as it will be obvious that a greater or lesser number of rods may be employed while maintaining the desired design, structural and functional characteristics for the unit.

The power feed trip mechanism of this example is designed upon operation thereof by engagement of a selected stop rod of the depth stop unit D, to cause down feeding movement of the cutter spindle head unit CH to stop to within ten to fifteen thousandths (.0010 to .0015) of an inch of the final depth position desired for the cutter spindle C relative to work table 16. A dial type micrometer indicator 75, referring to Figs. 5, 8 and 12, is provided for visually indicating to the operator the depth position relative to the final desired depth, at which the down feed of cutter spindle head unit CH is stopped by the operation of the automatic trip mechanism resulting from the engagement of the selected stop rod.

This dial type indicator 75 is, in this instance, mounted at the front or forward end of housing structure 40 and is automatically operated from plunger 65 upon downward movement of that plunger by engagement of the plunger with one of the stop rods 1, 2, 3 or 4. In this instance, a simple lever 76 is mounted in housing 40 extending in operative engagement between plunger 65 and an actuating member of the indicator 75. Lever 76 is mounted for rocking about a ball and socket joint 76a intermediate the opposite ends of the lever. The inner end of the lever 76 is formed with a ball head 76b which extends into a slot 76c formed in the adjacent lower side of plunger 65 for engagement by the upper wall of such slot upon downward movement of the plunger by engagement therewith of a stop rod of the depth stop unit D. The forward end of lever 76 is also provided with a ball head 76d for engaging the lower end of a depending actuating member 75a of the dial indicator 75. The dial indicator 75 may be provided with the reset button 75b located at the upper side thereof for resetting the indicator after a depth indicating operation by downward movement of plunger 65.

When plunger 65 is depressed by engagement with a stop rod, the inner end of lever 76 is rocked downwardly to rock the upper end thereof upwardly to operate dial indicator actuating member 75a to cause the indicator to show the number of thousandths of an inch from the desired depth of downward feed at which head CH has been stopped by the automatic operation of the trip mechanism. The feed downwardly of head CH to the final and precise depth level required, may then be made by manual rotation of the hand wheel MF in the proper direction. The extent of manual down feed necessary will be indicated to the operator by further operation of the micrometer dial indicator 75, through the continued depression of plunger 65 by down movement of the stop rod engaged therewith until the dial indicator has visually registered a predetermined scale marking or indicia thereon.

*Up feed stop*

Provision is made for automatically operating the power feed trip mechanism to arrest upward feeding under power of the cutter spindle head unit CH at a predetermined point or limit of upward movement for that head in order to prevent power feeding of the head against the limit stop pin 77 fixed in the front wall 10a of overarm 12. Stop pin 77 for limiting upward movement of head CH is shown in Fig. 3a.

In this example, a rod member 78, referring now to Figs. 1, 8 and 12, is mounted in fixed position depending downwardly from the lower mounting lug 70b of the depth stop bracket 70. Rod 78 is of a length such that the lower end thereof extends a distance below the contact end 65b of plunger 65 at the underside of housing 40. A horizontally disposed dog 79 is adjustably mounted in position on the lower end of rod 78, with this dog extending radially outwardly from the rod to a position with its outer end below contact end 65b of plunger 65 (see Fig. 12). Dog 79 is provided with a contact head 79a at the upper side thereof in vertical axial alignment with the contact end 65b of plunger 65.

Dog 79 is adjustably mounted in fixed position on rod 78 so that, when head CH attains a desired limit of upward movement, the dog engages contact end 65b of plunger 65 and forces such plunger upwardly to cause contact shoulder 65g of the plunger to engage finger 69d of bell crank unit 66 and thus through the trip mechanism hereinbefore described, move clutch spool 45 forwardly to neutral position disengaged with the up feeding gear 44 of the power feed reversing mechanism.

Cutter spindle drive

The cutter spindle C mounted on the vertically movable cutter spindle head unit CH, is power driven from the motor M mounted in the lower portion of column structure 10. Motor M includes the motor shaft $m$ and is so positioned in the column structure 10 that shaft $m$ lies in the vertical plane which passes through the axis of cutter spindle C and the feed screw 30 for the head unit CH, that is, the vertical plane passing through the center of the column structure from front to rear thereof.

Referring now to Figs. 1, 3, 3a and 19, the motor shaft $m$ is horizontally disposed and extends rearwardly to the exterior of the rear wall of column 10 where it mounts a multiple V groove pulley MP. Pulley MP drives through a multiple V belt system B, a pulley SP of the multiple V belt groove type which is mounted thereabove on a drive shaft 80. This drive shaft 80 is mounted in horizontal position in column 10 spaced above the motor and parallel with motor shaft $m$, with the rear end of this shaft 80 extended rearwardly and outwardly beyond the column structure rear wall and mounting thereon the pulley SP. Drive shaft 80 is rotatably journaled in the opposite end, anti-friction bearing assemblies 80a and 80b (see Fig. 3), such bearing assemblies being mounted and supported in suitable fixed structure of or provided on column structure 10. Drive shaft 80 is thus driven from motor M by the power transmission or drive consisting of pulleys MP and SP and the multiple V belt system B connecting these pulleys in driving relation. This shaft, like the motor shaft $m$, is mounted with its axis in the vertical plane which passes through the axis of motor shaft $m$, that is, the center vertical plane from front to rear of the column structure 10.

Preferably, the power transmission drive consisting of pulleys MP and SP and the belt system B located at the exterior side of the column rear wall, is enclosed and housed within a removable casing or housing 10'.

The motor M is, in this instance, of the reversible type so that the spindle drive of the invention may be operated to rotate cutter spindle C in either direction. But if found preferable, other means as a substitute for or in addition to reversibility of the motor, for operating the drive to rotate spindle C in either direction may be employed.

A countershaft 81 is mounted in horizontal position within the column structure 10 above driven shaft 80 with its axis parallel with the axis of the latter shaft. This countershaft 81 is mounted and journaled at its forward end in an annular roller bearing assembly 81a mounted in the forward wall of the column structure, with the shaft extending rearwardly through the column to an annular roller bearing assembly 81b which mounts and journals the rear end of the shaft at a location spaced to the rear of the forward end of drive shaft 80. Bearing assembly 81b is mounted and confined in suitable fixed structure projected inwardly into the column 10 from the rear wall thereof. Countershaft 81 is mounted and located in position in column 10 so that its horizontal axis lies in the same vertical plane which passes through the axes of the horizontal drive shaft 80 and motor shaft $m$.

Cutter spindle C is power driven from drive shaft 80 through the change speed gear unit CS, which is selectively operable to drive countershaft 81 at any one of several different rates of speed, and through the range gear organization RG driven from countershaft 81. The range gear organization RG, through a gear train to be hereinafter described, drives the cutter spindle C on the vertically movable head unit CH. The range gear organization RG is selectively operable to drive cutter spindle C in any one of several basic speed ranges.

Change speed gear unit

The change speed gear unit CS of the spindle drive, referring now particularly to Figs. 1, 3, 13, 15 and 19, includes a driving shaft 82 which is mounted and journaled at its opposite ends in anti-friction bearing assemblies 82a and 82b mounted in spaced parallel arms 82c and 82d, respectively, extending from the inner side of a face plate D. A side wall of column structure 10, in this instance, the left hand side wall when facing the machine, is formed with a generally rectangular opening D' therethrough. The face plate D is secured in position on the exterior of the column, over and closing opening D' with the driving shaft mounting arms 82c and 82d thereof, extending horizontally inwardly therefrom beneath countershaft 81 to a position in which the driving shaft 82 mounted at the inner ends thereof, is located in front of and in axial alignment with power shaft 80. The inner or rear end of driving shaft 82 is coupled into driving connection with the forward end of power shaft 80 by any suitable form of shaft coupling 82e, so that driving shaft 82 forms a forwardly extended, horizontal continuation of power shaft 80. Shaft coupling 82e normally connects shafts 80 and 82 in such driving relation that these shafts are driven as a continuous, unbroken rigid shaft. Driving shaft 82 is thus spaced below countershaft 81, intermediate the ends of the latter shaft, with its horizontal axis parallel with the horizontal axis of the countershaft and lying in the vertical plane which passes through the axis of the countershaft and through the axis of the motor shaft $m$ therebelow.

The driving shaft 82 provides the primary or power input shaft of the change speed gear unit CS, and is formed with a series of splines 82f thereon. Primary gear couplets 83, 84 and 85 are mounted and splined on shaft 82 for rotation by that shaft while being independently selectively slidable thereon in either direction axially of the shaft. Gear couplet 83 is positioned on shaft 82 adjacent that end of the shaft which is coupled to the power shaft 80, that is, the inner end of shaft 82 when facing the front of the machine. This primary gear couplet 83 includes the spaced primary gears 83a and 83b integral with the couplet. Gear couplet 84 is mounted on shaft 82 adjacent gear couplet 83 and includes the spaced primary gears 84a and 84b. Gear couplet 85 is mounted on shaft 82 adjacent couplet 84 and between that couplet and the adjacent forward end of the shaft. The gear couplet 85 includes the spaced primary gears 85a and 85b.

The gear 83a of couplet 83 has the smallest diameter of any one of the gears of the series of primary couplet gears and is located adjacent the inner end of shaft 82. This gear 83a provides for the lowest speed step of the change speed mechanism. Gear 83b is of increased diameter relative to the diameter of gear 83a and provides the next higher speed step of the unit CS. Gear 84a of couplet 84 is of increased diameter relative to the diameter of the adjacent gear 83b of couplet 83, and each of the succeeding gears 84b, 85a and 85b is of increased diameter relative to the diameter of the next adjacent preceding gear, respectively, of such series of primary gears, passing from the inner end along shaft 82 toward the outer end thereof, that is, from right to left when facing Fig. 3 of the drawings. Gear 85b provides for the highest speed step of the change speed unit CS. Thus, the three (3) primary gear couplets 83, 84 and 85 together form a series of six (6) gears providing for six (6) speed steps of progressively increased rates of speed from the low speed step defined by gear 83a to the high speed step defined by gear 85b.

The countershaft 81 forms the power output or driven shaft for the change speed gear unit CS and is provided with the splines 81c. Three (3) secondary or driven drum gear couplets 86, 87 and 88, adapted to be selectively engaged with and driven from the primary gear couplets 83, 84 and 85, respectively, are mounted and splined on shaft 81 for rotating that shaft. These secondary drum gear couplets are mounted and secured on shaft 81 in positions fixed against movements axially of the shaft.

The drum gear 88 is mounted at the inner end of shaft 81 in position opposite and spaced above of primary gear couplet 83 and includes the spaced spur gears 88a and 88b concentric with the shaft axis. Gear 88b is of relatively large diameter compared to gear 83a of primary couplet 83, while gear 88a has a smaller diameter than the diameter of the gear 88b.

Secondary drum gear couplet 87 is mounted on driven shaft 81 adjacent and substantially abutting drum gear 88, in position opposite and above primary gear couplet 84. Secondary gear couplet 87 includes the spaced spur gears 87a and 87b, with gear 87b having a smaller diameter than the diameter of the adjacent gear 88a and gear 87a having a smaller diameter than the diameter of the gear 87b.

The secondary drum gear 86 is mounted on driven shaft 81 adjacent and substantially abutting drum gear couplet 87, being located in position above and opposite primary gear couplet 85. Drum gear 86 includes the spaced spur gears 86a and 86b, with gear 86b being of smaller diameter than the diameter of the adjacent gear 87a of drum gear 87, and the gear 86a being of smaller diameter than the gear 86b.

Thus, the spur gears of the secondary or driven drum gear couplets 86, 87 and 88, progressively decrease in diameter from the inner or rear end of driven shaft 81 forwardly or outwardly therealong, while the gears of the primary gear couplets 83, 84 and 85 which are mounted on the driving or power input shaft 82, progressively increase in inverse order relative to the secondary gear couplets 86, 87 and 88, that is, progressively increase in diameter rearwardly or inwardly along the driven shaft 81.

The spacing of the pairs of gears of the primary gear couplets 83, 84 and 85, and the diameters of these gears relative to the spacing and the diameters of the spur gears of the secondary drum gear couplets 86, 87 and 88, is such that the gears 83a and 83b of couplet 83 extend between gears 88a and 88b of drum gear 88; the gears 84a and 84b of couplet 84 extend between gears 87a and 87b of drum gear 87; and the gears 85a and 85b extend between gears 86a and 86b of drum gear 86, when each of the primary gear couplets is in neutral or disengaged position relative to each of the secondary drum gear couplets respectively opposite and associated therewith.

Primary gear couplet 83 is movable axially on shaft 82 between a position with gear 83a thereof engaged with gear 88b of secondary gear 88 for the lowest speed step and a position with the gear 83b thereof engaged with the gear 88a of couplet 88 for the next highest speed step; primary gear couplet 84 is movable between a position with the gear 84a thereof engaged with gear 87b of the secondary drum gear couplet 87 for the third highest speed step, and a position with gear 84b thereof engaged with gear 87a of couplet 87 for the next or fourth highest speed step; and primary gear couplet 85 is movable between a position with gear 85a thereof engaged with gear 86b of the secondary drum gear couplet 86 for the next or fifth highest speed step, and a position with gear 85b thereof engaged with gear 86a of secondary gear couplet 86 for the next or highest speed step of the six (6) speed steps provided by the change speed unit CS.

Each of the primary gear couplets 83, 84 and 85, respectively, is movable to a neutral position, as shown particularly in Fig. 3, in which the gears of the couplet are disengaged from the gears of the respective secondary drum gear unit 86, 87 or 88 to be driven thereby, so that, in such neutral position a primary gear couplet is completely disconnected from driving relation with its secondary or driven drum gear couplet on shaft 81. Hence, by selective positioning of the gear couplets 83, 84 and 85, relative to the secondary gear couplets 86, 87 and 88, the power input or driving shaft 82 may be connected in driving relation with the power output or driven shaft 81 for driving the latter shaft at any selected one of six (6) rates of speed defined and provided for by the simple compound gear trains or sets 83a—88b; 83b—88a; 84a—87b; 84b—87a; 85a—86b; and 85b—86a, respectively.

It is to be noted that in each of the selected speed steps for which change speed gear unit CS is adjusted, the engagement of only two gears is required to drive the countershaft 81 from the power input or driving shaft 82 at the selected rate of speed. Thus, a change speed gear unit is provided in which the primary or driving gear couplets 83, 84 and 85, and the secondary or driven gear couplets 86, 87 and 88, respectively, form gear sets or trains of the simplest compound gear train form. The low speed primary gear couplet 83 is located on driving shaft 82 adjacent the rear end thereof and in immediate proximity to the rear bearing 82b of that shaft. Hence, when primary gear couplet 83 is shifted rearwardly on shaft 82 to engage gears 83a and 88b for the lowest speed step of the unit, gear 83a will engage with gears 88b in driving relation therewith at a location immediately adjacent the forward side of the rear bearing 82b of shaft 82. Lateral and torsional deflections of shaft 82 under low speed step loads are thus maintained at a minimum.

The change speed gear unit CS is, in accordance with the invention, formed of simple compound gear trains constituted by a set of two (2) gears for each step, namely, a driving gear and a driven gear, so that, it thus becomes possible to attain for the secondary or driven gear of each set, a maximum diameter. The secondary gear couplets are, as in the example hereof, provided by units of drum form, preferably of solid material, having substantial diameters and substantial width to provide the necessary spacing between the gears of each unit. The secondary gear couplets 86, 87 and 88 on shaft 81, thus provide a total weight mass which will develop a substantial fly wheel effect acting on the power output or driven shaft 82 of the change speed gear unit CS.

*Speed step selector mechanism*

The change speed gear unit CS is controlled by a manually operated selector mechanism by which any one of the six (6) simple compound gear trains of the change speed unit can be set up and activated for driving shaft 81 from shaft 82 at a rate of speed determined by the selected speed step from the six (6) speed steps provided for by the unit. In this example, and as a feature of the invention, the speed step selector mechanism is mounted as a component of and forming a unit with the face plate D, shaft 82 and the primary gear couplets 83, 84 and 85, of the change speed gear unit. Thus, the assembly of the face plate D, speed step selector mechanism and the power input shaft 82 with the primary gear couplets 83, 84 and 85 thereon, may be readily mounted in and as readily removed from column structure 10 in operative association with the power shaft 80 and the secondary drum gear couplets 86, 87 and 88, as a unit component of the cutter spindle drive from power shaft 80 to the cutter spindle C of the vertically movable cutter spindle head unit CH.

The speed step selector mechanism in the example hereof, referring to Figs. 2, 14, 15, 16, 17 and 19, includes a cylindrical barrel cam 90 mounted in horizontally disposed position on a horizontal shaft 90a parallel with the driving shaft 82, shaft 90a and barrel cam 90 being located in position intermediate the face plate D and the primary gear couplets 83, 84 and 85, on the shaft 82. The barrel cam shaft 90a is suitably mounted and journaled at its opposite ends in the opposite horizontally disposed, inwardly extending arms 82c and 82d of the face plate D, which arms also mount and carry at their inner, free ends the driving shaft 82. (See Figs. 15 and 17.)

Barrel cam 90 is mounted for rotation in either direction about the axis of shaft 90a and a spiral or worm gear 91 is mounted on and around the barrel cam concentric with shaft 90a, in position centrally located intermediate the opposite ends thereof. A horizontally disposed wall or base 92 (see Figs. 14 and 17) is provided extending inwardly from the lower end of face plate D, in position below shaft 90a and the barrel cam 90 thereon, such wall or base 92 being joined or connected at its opposite sides with the adjacent lower sides, respectively, of the opposite arms 82c and 82d. A worm shaft 93 is mounted and journaled at the upper side of wall 92 in spaced, upstanding journal boxes 92a and 92b (see Fig. 14) with the shaft disposed with its axis perpendicular to the axis of shaft 90a. Worm shaft 93 is extended forwardly and outwardly through face plate D to provide the outer end 93a. A worm 94 is fixed on shaft 93 for rotation therewith between the journal boxes 92a and 92b, with the worm in operative mesh with the worm gear 91 of the barrel cam 90 thereabove, so that, rotation of worm 94 in either direction by shaft 93 will revolve barrel cam 90 in one or the other direction about the horizontal axis provided by the shaft 90a. A hand crank 95 is mounted on the outer end 93a of worm shaft 93 for manually rotating the worm shaft in either direction to cause rotation of the barrel cam in the desired direction.

The barrel cam 90 is formed and provided with a cam groove 90R therearound intermediate worm gear 91 and the right hand end of the barrel cam, and with a cam groove 90L therearound between the worm gear and the left hand end of the barrel cam, when facing the face plate D at the exterior of the machine, as will be clear by reference to Figs. 15, 16, 17 and 19. These cam grooves 90R and 90L are designed for actuating, in synchronization with the direction and degree of rotation of hand crank 95, shifter mechanisms for selectively shifting the gear couplets 83, 84 and 85, respectively, to set up the change speed unit for any selected step of the six (6) speed steps provided by the unit.

For example, a slide 96 is slidably mounted on a horizontally disposed rod 96a extending across and between and secured at its opposite ends in the opposite arms 82c and 82d of dial plate D, with the rod and slide 96 being located intermediate the rear side of barrel cam 90 and the forward side of gear couplets 83, 84 and 85. Slide 96 is provided with an arm 96b which extends forwardly therefrom over the upper side of barrel cam 90 and which mounts at its forward end a cam follower 96c slidably received in and controlled by cam groove 90R of the barrel cam 90. The slide 96 is formed with or has rigidly attached thereto, a rearwardly extending shifter fork 84F. Fork 84F extends rearwardly to and is slidably engaged in a suitable fork receiving groove formed in and around the primary gear couplet 84. Thus, movements of slide 96 in either direction along a straight line path axially of rod 96a, effected by follower cam 96c under the control of the cam groove 90R, will move shifter fork 84F to shift the primary gear couplet 84 in the same direction axially of the shaft 82.

Primary gear couplet 85 on shaft 82 is shifted axially in either direction by a separate shifter mechanism also controlled from cam groove 90R of barrel cam 90 independently of the above described shifter mechanism for the primary gear couplet 84. The shifter mechanism for gear couplet 85, in this instance, includes a slide 97 mounted on a horizontally disposed rod 97a located in fixed position below rod 96a and between barrel cam 90 and the primary gear couplets 83, 84 and 85. This rod 97a extends across and is secured at its opposite ends in the opposite arms 82c and 82d of dial plate D. Slide 97 includes an arm 97b extending upwardly therefrom at the rear side of barrel cam 90 opposite cam groove 90R. This arm 97b mounts at the forward side of the upper end thereof a cam follower 97c which is slidably received and confined in cam groove 90R (see Figs. 14, 15 and 19). A shifter fork 85F is fixed in rigid position on and extending rearwardly from slide 97, to and slidably engaged in a suitable fork groove formed in and around primary gear couplet 85.

A third shifter mechanism is provided for shifting the primary gear couplet 83 independently of the shifting mechanisms above described for separately and independently shifting the primary gear couplets 84 and 85, respectively. The shifting mechanism for the primary gear couplet 83 includes, in this instance, a slide 98 slidably mounted on the rod 97a for straight line movements in either direction axially thereof, slide 98 being so mounted in position generally opposite cam groove 90L in the drum cam 90. Slide 98 includes an arm 98b extending upwardly therefrom at the rear side of barrel cam 90 opposite cam groove 90L, and mounts at the forward side of the upper end thereof a cam follower 98c which is slidably received and confined in cam groove 90L (see Figs. 15, 17 and 19). A shifter fork 83F is fixed in rigid position on slide 98 and extends forwardly therefrom to and is slidably engaged in a suitable fork groove formed in and around primary gear couplet 83. Thus, movements of slide 98 in either direction axially of rod 97a, effected by and under the control of cam follower 98c in the cam groove 90L, will shift the primary gear couplet 83 in the same direction axially on the driving shaft 82.

The cam grooves 90R and 90L are formed to provide cam tracks in and around the barrel cam 90 having such shapes or contours, respectively, that one complete revolution of cam 90 will cause synchronized operation of the respective shifting mechanisms for the primary gear couplets 83, 84 and 85, to successively set up such couplets for the six (6) successive speed steps provided for by the change speed unit CS. For example, with the change speed unit CS set by operation of hand crank 95 into position for the lowest speed step, the sector of the cam track of cam groove 90L then engaged by cam follower 98c has a contour to actuate such follower and the fork 83F operated thereby, to shift primary gear couplet 83 on shaft 82 to a position with gear 83a thereof engaged with gear 88b of the secondary gear 88. In this position of cam 90, the sectors of the cam track provided by cam groove 90R which are engaged by cam followers 96c and 97c, respectively, are so contoured that the primary gear couplets 84 and 85 controlled by such cam followers, respectively, are maintained in position disengaged from their respective secondary gear couplets 87 and 86.

Rotation of barrel cam 90 from the foregoing position through the next one-sixth (⅙) of a revolution by rotation of hand crank 95 to the right or clockwise will, due to the contours of the sectors of the cam tracks provided by the cam groves 90R and 90L, then engaged by cam followers 96c, 97c and 98c, respectively, cause shifting of the primary gear couplet 83 outwardly on shaft 82 to position with gear 83b thereof engaged with gear 88a of secondary gear couplet 88 to thus set the gear unit for the next higher speed step. The portions of the cam track of cam groove 90R then engaged by cam followers 96c and 97c, respectively, are so contoured as to maintain such followers in position to hold primary gear couplets 84 and 85 in positions disengaged from the secondary gear couplets 87 and 86, respectively.

With the above setting of the change speed unit CS for the second higher speed step, further rotation of cam 90 through the next one-sixth (⅙) of a revolution, will due to the contours of the sectors of the cam tracks provided by the cam grooves 90R and 90L then engaged by the cam followers 96c, 97c and 98c, respectively, cause shifting of the primary gear couplet 83 inwardly on shaft 82 to a position with the gears 83b and 83a thereof disengaged from the secondary gear couplet 88, and simultaneously cause shifting inwardly of the primary gear 84 on shaft 82 to position with the gear 84a thereof engaged with gear 87b of the secondary gear couplet 87 for the next or third higher speed step of the range of six (6) speed steps. The portions of the cam tracks of cam grooves 90R and 90L then engaged by the cam followers 97c and 98c, respectively, are so contoured as to maintain such followers in position to hold primary gear couplets 85 and 83 in positions disengaged from the secondary gear couplets 86 and 88, respectively.

On the next one-sixth of a revolution of cam 90 in the same direction, the cam grooves present cam tracks having contours such as to cause shifting of primary gear couplet 84 outwardly on shaft 82 into position with gear 84b engaged with gear 87a of the secondary gear couplet 87 for the fourth higher speed step, while maintaining primary gear couplets 83 and 85 disengaged from secondary gear couplets 88 and 86, respectively.

Rotation of cam 90 through the next succeeding one-sixth (⅙) of a revolution, will engage sectors of the cam tracks provided by the cam grooves 90R and 90L which have contours such as to cause shifting of primary gear couplet 84 inwardly on shaft 82 into position with the gears 84a and 84b thereof disengaged from secondary gear couplet 87, and to cause the shifting simultaneously of primary gear couplet 85 inwardly on shaft 82 into position with gear 85a thereof engaged with gear 86b of the secondary gear couplet 86 for the fifth higher speed step setting of the change speed unit CS. During this speed change adjustment and setting, the cam tracks of the cam grooves are so contoured as to cause the shifting mechanisms for the primary gear couplets 83 and 84, to remain inactive with these gear couplets disengaged from their respective secondary gear couplets 88 and 87, respectively.

Rotation of cam 90 through the next succeeding one-sixth (⅙) revolution to complete one (1) full revolution of the cam will present portions of the cam tracks provided by the cam grooves 90R and 90L, having such contours as to cause shifting of primary gear couplet 85 outwardly on shaft 82 into position with gear 85b thereof engaged with gear 86a of the secondary gear couplet to thereby set up and adjust the speed change unit for the sixth or highest speed step of the range of six (6) speed steps provided for by the unit. The portions of the cam tracks of cam grooves 90R and 90L then engaged by cam followers 96c, and 98c, respectively, are of a contour to maintain the primary gear couplets 83 and 84 in positions disengaged from the secondary gear couplets 87 and 88, respectively.

From the above setting of the change speed unit for the highest speed step, rotation of cam 90 through the last and final one-sixth (⅙) of a revolution to complete one (1) revolution thereof, will present sectors of the cam tracks provided by the cam grooves 90R and 90L, which are so contoured, respectively, as to cause operation of the shifting mechanisms to shift primary gear couplet 85 inwardly on shaft 82 to disengage gear 85b thereof from gear 86a of secondary gear couplet 86, and to shift simultaneously the primary gear couplet 83 inwardly on shaft 82 to engage the gear 83a thereof with the gear 88b of the secondary gear couplet 88, to thus set up the change speed unit CS for the lowest speed step. During the shifting and setting up of primary gear units 85 and 83, the sector of cam groove 90R engaged by cam follower 98c is formed with a contour such as to maintain primary gear couplet 84 in position disengaged from secondary gear couplet 87.

By rotating hand crank 95 to the left or counterclockwise with the change speed unit set in the above position for the lowest speed step, the shifting mechanisms will be actuated and controlled by the cam grooves 90R and 90L to first set up gears 85b and 86a of the primary and secondary gear couplets 85 and 86 for the highest speed step, and then upon continued rotation of cam 90 through succeeding one-sixth revolutions thereof, the unit will be set up for succeeding lower speed steps until again the lowest speed step is set up by the final one-sixth (⅙) revolution. The change speed gear unit CS is thus shiftable in either direction not only from the lowest speed step setting but also from any speed step setting of the range of six (6) speed steps provided.

*Speed selector crank and indicator dial*

The worm 94 on hand crank rotated shaft 93 and the worm gear 91 on barrel cam 90, provides a gear ratio such that one (1) complete revolution of hand crank 95 is required to rotate the barrel cam through one-sixth of a revolution. Hence, it requires six (6) complete revolutions of the hand crank 95 and shaft 93 to revolve barrel cam 90 through one (1) complete revolution.

A speed selector dial DS of disc or circular form, referring now to Figs. 14, 15 and 16, in connection with Fig. 2, is rotatably mounted and journaled in position located at the exterior of face plate D above shaft 93 for rotation in a vertical plane about a horizontal axis. This dial DS is provided with a stub shaft 100 extending rearwardly from the axis of the dial, rotatably mounted and journaled in the horizontal bore through a journal boss 100a formed in the face plate D. Dial DS is preferably formed with a convex or conical shaped outer indicia bearing face and is received in a circular recess formed in the face plate D, as will be clear by reference to Fig. 14.

The dial DS is rotated from and by rotation of shaft 93 by the hand crank 95 through the medium of a pinion gear 101 on shaft 93, in mesh with a large diameter spur gear 102 mounted on the inner end of stub shaft 100 of the dial DS. The gear ratio between pinion gear 101 and the dial mounted gear 102, is such that for each complete revolution of hand crank 95, the gear 102 and dial DS will be revolved through one-sixth of a revolution.

The face of dial DS, referring now to Fig. 20 in connection with Figs. 2 and 16, is divided by six (6) radial ridges or ribs into six (6) sectors identified in Fig. 20, as 1', 2', 3', 4', 5', and 6', corresponding to and representing the successively increasing speed steps, respectively, provided for by the change speed gear unit CS.

A series of three (3) concentric circular ribs or ridges are provided on the face of the dial to form three (3) concentric bands, the inner of which is identified in Fig. 20 as L', the intermediate as I', and the outer as H', respectively. These concentric bands H', L' and I' correspond to and represent the low, intermediate and high speed ranges, respectively, provided for by the speed range organization RG of the cutter spindle drive, to be hereinafter described in detail.

The rate of speed of rotation of the cutter spindle C in terms of revolutions per minute (R. P. M.) is represented for each of the six (6) speed steps in each of the three (3) speed ranges, by a number which is placed in that space provided by that speed band of the speed step sector which corresponds to the speed step set up by the change speed unit CS in the speed range selected by the speed range organization RG to drive cutter spindle C at the indicated R. P. M. For example, in Fig. 16, the speed indicator dial DS is shown in position with the change speed unit CS set up for the lowest speed step, so that, speed step sector 1' of the dial is located at the index or reading point. The operator may then by selecting one of the speed ranges provided for by the speed range organization RG, determines the rate of speed at which cutter spindle C will be driven by reading the number of the speed range band L', I' or H' in speed step sector 1', which corresponds to the selected speed range.

The index or reading point for the indicator dial DS of this example is located at the upper side of the dial and consists of an index finger or pointer 103 mounted in fixed position on face plate D and extending down over the speed indicator dial, as will be clear by reference to Figs. 14 and 16.

Referring now to Fig. 14, the speed selector hand crank 95 is provided at the outer end thereof with a handle 95a disposed transversely and extending outwardly from the outer free end of the crank. This handle 95a is slidably mounted on crank 95 by means of a pin 95b which is slidably received and extends inwardly through a transverse bore in the outer end of the crank, with the inner end of the pin extended inwardly from the crank to provide a latch 95c. Handle 95a and its mounting pin 95b which provides the latch 95c, are continuously biased inwardly of the handle by a spring member 95d.

The speed indicator dial DS is provided with a centrally located bore or recess 95e in the outer side thereof and aligned with the axis of the dial, for removably mounting and seating therein the latch 95c of pin 95b. The radial distance between the axis of the crank operated shaft 93a and the axis of latch pin 95c is such that when crank 95 is swung upwardly and reaches the peak of its arc of upward swing, latch pin 95c will axially align with dial bore 95e and the pin under the action of spring 95d will snap into bore 95e and thus releasably latch the handle in such upward swing position.

Thus, in operation from a latched position, say the position shown in Fig. 16 in which the change speed unit CS is set up for the low speed step thereof, and sector 1' of dial DS is in position at the upper side of the dial at the index finger 103, the operator in order to select and set up any one of the higher speed steps, withdraws latch pin 95c from latched position and rotates hand crank 95 to the right through the number of complete revolutions necessary to bring the selected speed step sector into position at the index finger 103. On each complete revolution of hand crank 95 and the positioning of a speed step sector of dial DS, index finger 103 and hand crank 95 will be in position for the latch pin 95c to seat in dial bore 95e, and thus releasably latch the speed step selector mechanism in a selected position of adjustment.

It is to be particularly noted that a unit assembly is provided by the mounting of the primary gear couplets 83, 84 and 85 of the change speed unit CS on the face plate structure D, together with the mounting on the face plate of the speed step selector mechanism and the selector hand crank 95 and its associated speed indicator plate DS. By this unit assembly it is possible by merely detaching the face plate D from its mounted position on the column structure 10, to withdraw such unit assembly from mounted position, or, conversely to insert and install such a unit assembly in mounted operative position. In order to effect such removal and installation of such assembly as a unit, the primary gear couplets 83, 84 and 85 are shifted to completely disengaged positions with their respective secondary gear couplets 88, 87 and 86, respectively (see Fig. 3), so that the primary gear couplets may then move outwardly with the unit between the gears of the secondary couplets without interference. The shaft coupling 82e, by which power shaft 80 is coupled to the primary or driving shaft 82 of the change speed unit is preferably of a "slip" type such as provided by radial key and slot form of coupling, so that, shaft 82 may be readily disconnected and connected from and to shaft 80 for removal or installation of the unit assembly.

Range gear organization

The range gear organization generally identified herein as RG forms a component of the cutter spindle drive and provides for a plurality of different basic speed ranges within which the cutter spindle drive may be selectively operated, respectively. The range gear organization RG is driven by and from the driven or power output shaft 81 of the change speed unit CS.

In the example machine, referring to Figs. 3, 3a, 5, 13 and 19 in connection with Figs. 1 and 2, the range gear organization includes the vertically disposed shaft 105 mounted in position above the outer or forward end of shaft 82 with the vertical axis of this shaft 105 located in the same vertical plane in which lie the axes of the cutter spindle C and the head feed screw 30, that is, the vertical plane that passes through the center of the column structure 10 of the machine from front to rear thereof. Shaft 105 is rotatably mounted and journaled at its lower end portion in the spaced annular roller bearing assemblies 105a and 105b of the combined radial and thrust type, with these bearing assemblies mounted and positioned in the upper and lower ends, respectively, of a bearing sleeve mounting assembly 105c secured in vertically disposed position in fixed structure 105d of column 10. Bearing assembly 105a is of a type to care for axial loads acting in an upward direction, while bearing assembly 105b is designed to care for axial loads acting in a downward direction, along shaft 105. The lower end of shaft 105 below bearing assembly sleeve 105c, mounts thereon a bevel gear 106 suitably splined or otherwise fixed to the shaft for rotation therewith. The bevel gear 106 is engaged with a bevel gear 106a splined on the forward end of the driven or power offtake shaft 81 of the change speed unit CS. The engaged bevel gears 106 and 106a have a 1:1 ratio, hence shaft 105 is driven at the same rate of speed at which shaft 81 is driven, such rate being dependent upon that speed step set up in the change speed unit CS.

The upper end of shaft 105 mounts thereon a relatively large diameter, high speed range gear H of the helical or spiral type, the upper end of shaft 105 being smooth surfaced and journaled in the axial bore of an upwardly extended hub 105e of gear H. Thus mounted, gear H is rotatable on and independently of shaft 105. The upwardly extended hub 105e of high speed range gear H is mounted and journaled in a bearing assembly consisting of the spaced upper and lower annular roller bearing units 105f of the combined radial and thrust type to care for thrust loads acting in either direction along the axis of shaft 105. The spaced bearing units 105f are mounted in an annular bearing carrier 105g secured in a plate member 105h, (see Figs. 3a and 13) attached on and bridging fixed structure located within the column 10 at opposite sides thereof. Thus, the bearing assembly comprised of bearing units 105f and carrier 105g, provide combined radial and thrust bearings for the high speed range gear H and the upper end of shaft 105 rotatably journaled in the hub of that gear.

Shaft 105 is formed with the splines 105i thereon extending between bearing assembly 105b and the underside of high speed range gear H. A gear cluster or couplet unit 107 comprising the low speed range gear L and the intermediate speed range gear I, is mounted on and splined to shaft 105 for driving relation thereby, between high speed range gear H and bearing 105b spaced therebelow. The gear cluster 107 is mounted on shaft 105 in position with the intermediate range gear I thereof located on the shaft between the low speed range gear L of the cluster and the high speed range gear H mounted on the upper end of the shaft. Low speed range gear L is in the form of a relatively small diameter pinion gear, while intermediate speed range gear I is of a diameter greater than the diameter of gear L but less than the diameter of the high speed range gear H. Gear cluster 107 is vertically slidable as a unit on shaft 105 between a position with the intermediate range gear I raised to and in engaged driving relation with the high speed range gear H, and a lowered position with the low speed range gear L located adjacent shaft bearing 105b and with the intermediate range gear I moved downwardly on the shaft to a position disengaged from high speed range gear H.

The high speed range gear H at the lower or underside thereof, is provided with a series of clutch teeth 107a therearound concentric with the axis of the gear, and the intermediate range gear I for gear cluster 107 is provided at the upper side thereof facing gear H with a series of clutch teeth 107b therearound for clutching engagement with teeth 107a of the high speed range gear H when the gear cluster 107 is moved upwardly on shaft 105 to position for engaging the clutch teeth 107b thereof with the clutch teeth of gear H. In the engaged position of the high speed range gear H with the intermediate speed range gear I, the high speed range gear H is driven by and from shaft 105 and the intermediate range gear I.

A stub or bull shaft 108, referring now to Figs. 3a and 19 in connection with Fig. 2 is mounted in vertically disposed position intermediate shaft 105 and the lower spindle portion 33 of feed screw 30, with the vertical axis of this shaft 108 disposed in the same vertical plane in which lie the vertical axes of cutter spindle C, feed screw 30 and shaft 105, of the cutter spindle drive, that is the vertical plane passing through the center of the column 10 from front to rear thereof. The lower end of shaft 108 is mounted and journaled in an annular roller bearing assembly 108a of the combined radial and thrust type, such bearing assembly being mounted in fixed structure within the column 10. The upper end of shaft 108 is mounted and journaled in an annular roller bearing assembly 108b of the combined radial and thrust type, such bearing being secured in a plate member 108c, supported on opposite side, fixed structure within column 10. This bearing mounting plate 108b is located in the same horizontal plane as the bearing mounting plate 32a for feed screw bearing 32 and the bearing plate 105h for the bearing carrier 105g, so that if desired, as in the example hereof, these plates may be formed integral as a single unitary plate. Lower bearing 108a for shaft 108 is designed to care for downwardly acting thrust loads of bull shaft 108, while the upper bearing 108b therefor is designed to care for upwardly acting thrust loads.

The stub or bull shaft 108 mounts thereon a series of three (3) speed range gears, namely, a high speed range gear SH of the helical or spiral type, an intermediate speed range gear SI, and a low speed range or so called bull gear SL, gears SI and SL in this example each being of the spur type.

The high speed range gear SH on shaft 108 is of considerably smaller diameter than and is adapted to be selectively engaged by, the high speed range gear H on shaft 107. The gears H and SH thus form a set or pair of gears from which cutter spindle C is driven from shaft 81 in the high speed range. Intermediate range gear SI on shaft 108 is of greater diameter than the diameter of gear SH and is adapted to be engaged by the intermediate range gear I of gear cluster 107 on shaft 105. Intermediate range gear SI is in this instance, of greater diameter than the diameter of gear I to be engaged therewith. The gear SI and the gear I thus provide the set or pair of gears from which cutter spindle C is driven in the intermediate speed range. The low speed range gear or so called bull gear SL on shaft 108 is adapted to be selectively engaged with the low speed range gear L of the gear cluster 107, to thus provide a set or pair of gears from which cutter spindle C may be driven in the low speed range.

The stub or bull shaft 108 is formed on the intermediate portion of its length with the splines 108d, and the spiral type, relatively small diameter high speed range gear SH is splined on shaft 108 opposite and in engagement with the spiral type, relatively large diameter high speed range gear H on shaft 105. The high speed range gears H and SH are maintained in constant engagement. Gear H when disengaged from the gear cluster 107 on shaft 105, is rotated as an idler gear on shaft 105 by rotation of shaft 108 and the high speed range gear SH which is in constant engagement with gear H.

The intermediate range gear SI has a relatively greater diameter than the diameter of the pinion gear SH and is of substantial thickness to provide a large diameter solid material hub portion h. Gear SI is splined on shaft 108 in position immediately below gear SH with the upper side of gear SI abutting the adjacent lower or underside of the gear SH and with the gear forming, toothed portion of the gear SI at the upper side of and adjacent gear SH, so that the hub portion h of gear SI is at the lower or underside of the gear.

The low speed range gear or so called bull gear SL is of greater diameter than the diameter of the intermediate range gear SI and is formed of substantial thickness to provide a relatively large diameter, solid material hub portion h' of considerable thickness or width relative to the toothed portion of the gear. The low speed range gear SL is mounted on the lower end of shaft 108 below and immediately adjacent intermediate range gear SI, with the upper side of gear SL abutting against the adjacent underside of gear SI. Preferably, the bull gear SL is not directly keyed or splined to shaft 108, but is placed in driving connection therewith through the intermediate speed range gear SI by means of a radial key and slot arrangement connecting the abutting faces of these gears as indicated by the radial slot k in Fig. 19. Due to the design and construction of the gears SH, SI and SL, on shaft 108, these gears together provide a substantial weight mass, so that, a very effective fly-wheel effect is developed thereby acting on the shaft 108 of the power drive from the power take-off shaft 81 of the speed change unit CS to the cutter spindle C.

Range gear H on shaft 105 is in constant mesh with range gear SH on shaft 108, and these constantly engaged gears H and SH comprise the set of gears for rotating shaft 108 in the high speed range. The gear cluster 107 which includes range gear I, is splined to and vertically slidable axially on shaft 105, and range gear I is adapted to be engaged with range gear SI on shaft 108 to provide the set of range gears for driving the latter shaft in the intermediate speed range. Range gear L of gear cluster 107 is adapted to be engaged with the low speed or bull gear SL mounted on shaft 108. Range gears L and SL when engaged, provide the set of gears for driving shaft 108 in the low speed range.

The gear cluster unit 107 is so designed that when it is moved upwardly on shaft 105 to position engaging the clutch teeth 107b of gear I thereof, with the clutch teeth 107a of gear H for driving this latter gear from shaft 105, gears I and L of gear cluster 107 are located in positions raised above and out of engagement and driving relation with gears SI and SL, respectively, on shaft 108. When gear cluster 107 is moved downwardly to position with gear I thereof disengaged from gear H, but with gear I engaged in driving relation with gear SI for driving shaft 108 in the intermediate speed range, gear L of the gear cluster is lowered but still remains in position above and out of engagement with gear SL on shaft 108. When gear cluster 107 is further lowered on shaft 105 to position engaging gear L with gear SL for driving shaft 108 from shaft 105 in the low speed range, then gear I of the gear cluster is lowered to a position below and out of engagement with gear SI.

The cutter spindle C is connected in driving relation with and is driven from shaft 108 through a gear train comprising a gear 109 splined on the upper end of shaft 108 and a gear 110 mounted on the lower end spindle portion 33 of feed screw 30 for rotation independently thereof. The gear 110 is mounted with the spindle portion 33 of feedscrew 30 extending through and for rotation in the hub thereof, and is located in the space formed between the depressed central portion 31a of partition 31b and the bearing mounting plate 32a which bridges such space (see Fig. 4). Gear 110 is provided with extended hub portions at the upper and lower sides thereof, with such extended hub portions received and journaled in the upper and lower bearing assemblies 31 and 32, respectively, for the depending spindle portion 33 of the feed screw 30. Thus mounted, the gear 110 and the feed screw 30, are rotatable independently of each other, with the gear having as its axis of rotation, the vertical axis of the feed screw which latter axis is located in the vertical plane passing from front to rear through the center of the column structure 10.

At the inner side thereof, gear 110 is in driven engagement with gear 109, while at a diametrically opposite location on the forward side thereof it is in driving engagement with the drum gear 25 on the cutter spindle C. The forward wall 10a of the overarm 12 is formed with a horizontal slot 10i (see Fig. 5) therethrough which receives and through which the forward side of gear 110 extends, while the rear wall of the head forming casting structure 20 is formed with a vertical opening 20i downwardly therethrough (see Fig. 5) having a depth by which clearance is provided for the continuous engagement of gear 110 with drum gear 25 throughout the range of vertical movements upwardly and downwardly of drum gear 25 with the cutter spindle head unit CH. The drum gear 25 on cutter spindle C by which the spindle is driven from gear 110, is in continuous sliding engagement with gear 110 and has a depth or height at least equal to the overall range of vertical movement of spindle C with head unit CH, so as to maintain driven engagement with gear 110 as the drum gear 25 moves vertically with cutter spindle C.

*Speed range selector mechanism*

A manually operable mechanism is provided for selectively setting up any one of the three (3) speed ranges provided for by the sets of range speed gears L—SL; I—SI; and H—SH, respectively, of the range gear organization RG. This speed range selector mechanism is selectively operable by means of a hand crank 111 mounted in position located at the exterior of face plate D immediately above and adjacent the speed indicator dial DS. In this example, selector crank 111 is fixed on the outer end of a horizontally disposed shaft 111a journaled in and extended through a bore formed through the face plate D, as will be clear by reference to Figs. 14, 15 and 19. Shaft 111 is positioned with its horizontal axis located in the same vertical plane in which lies the horizontal axis of shaft 83 of the speed step selector mechanism.

Referring now to Figs. 3a, 13 and 14, the gear cluster 107 which provides the intermediate and low range gears I and L, is selectively shifted vertically on shaft 105 to set up the range gears for any one of the three (3) basic speed ranges, by means of a shifter fork 112 which is slidably received and engaged in a suitable fork groove formed in and around gear cluster 107 between the gears I and L of the cluster. Shifter fork 112 is mounted on and extends radially in horizontally disposed position from a vertically disposed shifter push rod 114. Push rod 114 is slidably mounted at its lower end in a horizontally disposed lug 114a (see Fig. 13) extended inwardly from the adjacent side wall of column 10 and at its upper end is slidably mounted in and extends upwardly through the bearing mounting plate 105h for the upper bearing assembly 105e of shaft 105. The vertically movable shifter fork actuating push rod 114, so mounted, extends downwardly through and depends a distance below the lower mounting lug 114a. The depending lower end of rod 114 is operatively coupled with hand selector crank 111 by a suitable actuating mechanism for raising and lowering rod 114 to cause fork 112 to shift gear cluster 107 to a position setting up the range gear organization for operation in the selected basic speed range.

Referring to Figs. 13, 13a, 13b, 13c, 17 and 19, such selector crank operated shifter fork actuating mechanism may include, as in the example hereof, a crank 115 fixed on the inner end of hand crank shaft 111a and depending downwardly therefrom in position immediately adjacent the inner side of gear 102 of the speed step selector mechanism mounted therebelow on face plate D. Crank 115 mounts at the outer free end thereof a crank pin 115a which extends rearwardly therefrom. A circular shifter plate or disc 116 is eccentrically mounted on the forward end of a horizontally disposed shaft 116a which is rotatably mounted and journaled in a depending shaft hanger 116b formed in this instance as an integral part of the adjacent side wall of column structure 10. Shaft hanger 116b is positioned between crank 115 and the lower end of push rod 114, with the shaft 116a journaled therein and extended therethrough in position with the axis of the shaft parallel with the axis of shaft 111a. The shifter plate 116 is eccentrically mounted on shaft 116a with the portion thereof of greatest radial width disposed generally below shaft 116a. A radial groove 116c is formed in the lower portion of the shifter plate 116 below the shaft 116a with the crank pin 115a of crank 115 slidably received and engaged in groove 116c. Thus, rotation of hand crank 111 to the right or the left will correspondingly swing crank 115 and through the crank pin 115a engaged in groove 116c of shifter plate 116, cause corresponding rocking of the shifter plate and the shaft 116a on which the plate is mounted.

A shifter arm 117, which in this instance is in the form of a generally triangular plate member, as will be clear by reference to Figs. 13a, 13b, 13c and 19, is secured at one corner thereof on the inner end of shaft 116a in position with the shifter arm extended upwardly from the shaft. Spaced rollers 118 and 119 are mounted on and extend rearwardly from the inner side of shifter arm 117, located in the opposite corners, respectively, adjacent the upper edge of the triangular plate member forming such arm.

A shifter yoke 120 is secured on the lower end of push rod 114 and is provided on the forward side thereof with a horizontally disposed slot 120a into which the rollers 118 and 119 on shifter arm 117 are received for movements in either direction longitudinally of the slot. In this example, the arrangement is such that when shifter arm 117 is swung to the right or clockwise by clockwise swinging of selector crank 111, roller 118 is moved outwardly to the right from and clear of the groove 120a of shifter yoke 120, while roller 119 is also moved to the right through groove 120a until it assumes a position directly above and with its axis in the vertical plane passing through the axis of shaft 116a of the shifter arm 117. This movement of shifter arm 117 will cause roller 119 in the groove 120a to force push rod 114 upwardly and thereby raise or shift gear cluster 107 upwardly on shaft 105 to engage the clutch teeth 107b of range gear I with the clutch teeth 107a of range gear H, to thus drive gear H from shaft 105 for high speed range operation. When gear cluster 107 is raised upwardly to position with gears H and SH fully engaged, the roller 119 of shifter arm 117 will be in position above and vertically aligned with shaft 116a. Thus, with gear cluster 107 raised to position selecting and setting up the high speed range gears H and SH, the full weight or load of gear cluster 107 is carried by roller 119 and shaft 116a, so that no turning moments are developed acting in either direction about shaft 116a. This is so because in such position of adjustment, the centers of the roller 119 and of the shaft 116a are in a straight vertical line. Hence, the crank handle 111 is completely unloaded with the gear cluster 107 effectively held by gravity in its raised position of high speed range gear. This gravity locked position of shifter arm 117 with the gear cluster 107 in its raised, high speed range position, is shown in Fig. 13a.

When the shifter arm 117 is swung to the left or counterclockwise by selector crank 111 to lower gear cluster 107 from its raised, high speed range selection position, or when shifter arm 117 is rotated to the right or counterclockwise to raise gear cluster 107 from its lowered, low speed range selection position, both rollers 118 and 119 are moved in and through groove 120a of shifter yoke 120 until the gear cluster 107 is in position with intermediate range gear I thereof engaged with range gear SI on shaft 108 for operation of the cutter spindle drive in the intermediate speed range. When gear cluster 107 reaches a position with gears I and SI engaged, both rollers 118 and 119 are engaged in groove 120a of shifter yoke 120 but with the rollers spaced at opposite sides of the vertical plane passing through the rotating center of the hand crank 111. Thus, with rollers 118 and 119 positioned spaced from both sides of the rotating center of hand crank 111 the full weight of gear cluster 107 is carried by the rollers, no turning moments are developed acting on the hand crank by the weight of the gear cluster. The speed range selector mechanism is thus effectively held in position with the intermediate speed range gears I and SI engaged by what is in effect a gravity lock. Such intermediate range gear selected position for the shifter arm 117 is shown in Fig. 13b of the drawings.

When the shifter arm 117 is swung to the left or counterclockwise to lower gear cluster 107 from position with the intermediate range gears I and SI engaged, to position engaging the low speed range gear L thereof with the low speed range or bull gear SL on shaft 108, shifter arm 117 is swung to the left or counterclockwise to a position with roller 119 swung outwardly from and completely clear of groove 120a of shifter yoke 120 and with gear 118 positioned in the left hand end of the groove, as shown in Fig. 13c. In such position, roller 118 carries the full load of gear cluster 107 and this load is transmitted to and carried by the hand crank 111. This loaded condition of the hand crank 111 which developes forces thereon acting to rotate the crank clockwise and downwardly from its position with the low speed range gears L and SL engaged, is taken care of by a positioning and supporting lug 121 secured on the exterior of face plate D on the left hand side of speed step indicator dial DS which is engaged by and supports crank 111 in low range position, as will be clear by reference to Fig. 16.

An arrangement is provided to further hold and secure the gear cluster 107 in either its raised, high speed range gear engaging position or in its lowered, low speed range gear engaging position, particularly when the face plate D with the hand crank 111, shaft 111a, and crank 115 mounted thereon is removed from mounted position in column 10. Such an arrangement, referring to Figs. 18 and 19, may include an arcuate slot 116d formed in the shifter disc 116 and a pin 116e secured in fixed position in the forward side of shaft hanger 116b with the forward end of this pin slidably received in the arcuate slot. The arcuate slot 116d lies on a circle generated about the axis of shaft 116a as a center, and has a length such that one end thereof provides a seat engaged by pin 116e when shifter disc is in position with gear cluster 107 raised for high speed range gear engagement, while the other end thereof provides a seat engaged by pin 116e when gear cluster 107 is in its lowered, low speed range gear engaging position.

As will be clear by reference to Fig. 16 of the drawings, the face plate D is provided with a positioning stop 122 for receiving and locating selector hand crank 111 in position thereof with the intermediate range gears I and SI, engaged and set up for intermediate speed range operation. A positioning and supporting lug 123 is mounted on face plate D in position above and to the right of speed step indicator dial DS for engagement by the selector hand crank 111 when that crank is in position with the high speed range gears H and SH engaged for high speed range operations. If desired, as in the example hereof, selector crank 111 may be provided with a spring loaded handle 111b similar to the handle 95a of speed step selector hand crank 95, and a recess may be formed in each of the positioning lugs 121, 122, and 123, for releasable engagement by the latch pin 95c of such a handle when the handle is in an adjusted position in order to prevent inadvertent displacement of the crank.

Attention is here directed to the fact that the hand crank 111, shaft 111a, and crank 115 with crank pin 115a, are removable with and as a part of the unit assembly provided by the face plate D and the elements of the change speed unit CS and the speed step selector mechanism, hereinbefore identified. When such unit assembly is removed from or replaced in mounted position in column 10, the crank pin 115a merely lifts out of or slides into engaged position in the radial groove 116c of shifter disc 116, so that no positive coupling or connecting elements which call for manipulation to disconnect or connect, are required.

Thus, the power drive for the cutter spindle C includes as component organizations thereof, the change speed gear unit CS providing six (6) different speed steps and driving the speed range organization RG which provides three (3) different speed ranges, so that, the cutter spindle drive of this particular example machine enables the cutter spindle C to be selectively driven at any one of eighteen (18) rates of speed. Adjusting and setting up the cutter spindle drive for driving cutter spindle C at any one of the available eighteen (18) rates of speed may be readily, quickly and accurately effected by the operator from the speed step selector hand crank 95 and the speed range selector hand crank 111, both located in immediate proximity to each other in completely visible and accessible positions on the face plate D at the left hand side of the machine. As the change speed gear unit CS is commonly operable throughout its range of speed steps through the range gear organization RG, it follows that the operator in order to set up the cutter spindle drive for a desired rate of speed of operation of cutter spindle C, may adjust and set up by the selector crank 111, that one of the three (3) speed ranges of the range gear organization RG in which the desired rate of speed may be obtained, and then may adjust by the selector crank 95, the change speed unit CS to that one of the six (6) speed steps provided for by that unit which will cause operation in the selected speed range of the cutter spindle at the required rate of speed. The foregoing order of adjustment by which the speed range is first set up and then the change speed unit CS is selectively operated to set up the required speed step, is not critical and can be carried out in reverse order, that is, the required speed step being first set up and then the speed range by selective operation of speed range organization RG.

By the design, arrangement and mounting in the column and overarm structure 10—12, of the various components and elements making up the cutter spindle drive from motor M to the cutter spindle C, the path of power flow is in, along and confined to the vertical plane of the column and overarm structure from front to rear of the machine. This is effected by locating all of the shaft elements, including the motor shaft $m$ and the cutter spindle C, with their axes in such vertical central plane and mounting all gears on and driven from and by such shafting with their axes in and with their areas of mesh or engagement centered in such vertical plane.

The change speed gear unit CS is made up from simple compound gear trains which are so designed and arranged that the engagement of only two (2) gears is required for each of the speed steps provided for by the unit, and similarly, the speed range organization RG is so designed that the engagement of two (2) gears only is required for operation of that organization for any one of the speed ranges for which it provides. By the arrangement of the drive of the invention, the gear train from the speed range organization RG to the cutter spindle C embodies but three (3) gears, including the drum gear 25 on the cutter spindle C, with the intermediate of these gears mounted on the cutter spindle head unit feed screw 30 as an axis, and being journaled in the same bearings which serve to mount and rotatably support such feed screw, so that an arrangement and mounting of extreme simplicity is attained. The design, mounting and arrangement of the cutter spindle drive and of the feed for the cutter spindle head unit CH gives maximum compactness in the vertical as well as in the horizontal dimensions, so that the size and weight of the frame or column structure 10 and overarm 12 may be maintained within practical and efficient manufacturing and use limits.

While the change speed gear unit CS of this example is designed to provide for six (6) speed steps and the speed range organization RG is designed to provide for three (3) speed ranges, it will be evident and should be understood that within the intent and scope of my invention, a change speed gear unit providing a greater or lesser number of speed steps than six (6) and/or a range gear organization providing a greater or lesser number than three (3) speed ranges may be provided.

It is also evident that various other forms, designs, arrangements and constructions of parts and elements, as well as combinations of parts and elements, might be resorted to without departing from the broad spirit and scope of my invention, hence I do not desire to limit my invention in all respects to the exact and specific disclosures hereof.

What I claim is:

1. In a machine tool, in combination, a column structure having a horizontally disposed overarm extending forwardly therefrom, a cutter spindle head unit mounted at the forward side of said overarm for vertical movements thereon along a straight line path, a cutter spindle rotatably mounted in vertical position in said head unit for vertical movements therewith, said cutter spindle being positioned with its axis perpendicular and lying in the vertical plane passing through the center of said overarm from front to rear thereof, a feed screw rotatably journaled in vertical position in said overarm spaced to the rear of said cutter spindle head unit, said feed screw being positioned with its vertical axis parallel with the axis of said cutter spindle and located in said vertical plane, a nut member mounted on and supported from said head unit in position spaced to the rear thereof in threaded engagement with said feed screw, means for rotating said feed screw in either direction to thread said nut member upwardly or downwardly on said feed screw to cause corresponding vertical movements of said cutter spindle head unit, a power drive for said cutter spindle including, a driven gear fixed on said spindle within said head and being vertically movable therewith, a driving gear mounted on and rotatable independently of the lower end of said feed screw within said overarm, and said driving gear being in driving engagement with said driven gear on said cutter spindle.

2. In a machine tool, in combination, a column structure having a horizontally disposed overarm extending forwardly therefrom, said overarm provided at the forward end thereof with a transverse, vertical wall thereacross having vertical slideways therein, a cutter spindle head unit mounted in vertically disposed position in said slideways for vertical movements upwardly and downwardly thereon along a straight line path, a cutter spindle rotatably mounted in vertically disposed position in said head unit with its axis perpendicular and located in the vertical plane passing through the center of the overarm from front to rear thereof, a feed screw rotatably journaled in vertically disposed position in said overarm adjacent but spaced to the rear of the overarm forward wall, said feed screw being positioned with its vertical axis parallel with the axis of said cutter spindle and being located in said vertical plane, a nut member supported from the upper end of said cutter spindle head unit in threaded engagement with said feed screw, means for rotating said feed screw in either direction to cause feeding of said head unit with said cutter spindle upwardly or downwardly, a power drive for said cutter spindle including a driven gear of drum form fixed on said cutter spindle and having a vertical length at least equal to the overall range of vertical movement in either direction of said cutter spindle, a driving gear within said overarm mounted on and rotatable about the lower end of said feed screw as an axis, the forward wall of said overarm being formed with an opening therethrough in the horizontal plane of said feed screw mounted driving gear, said head unit being formed to expose the rear side of said spindle mounted drum gear, and said driving gear being extended forwardly through said forward wall opening and maintained in constant engagement with said spindle mounted drum gear.

3. In a machine tool, in combination, a cutter spindle head unit mounted for movements in either direction along a straight line path, a cutter spindle mounted and journaled in said head unit in position with its axis parallel with the path of head unit movement, a feed screw for said head unit mounted in position removed from said head unit and parallel with said cutter spindle, a drive for said cutter spindle including a gear mounted in position removed from said head unit for rotation about an axis parallel with the axis of said cutter spindle, said gear being provided with an axial bore therethrough, and said feed screw being extended through said bore for relative rotation of said gear and said screw independently of each other.

THEODORE F. ESERKALN.

REFERENCES CITED

The following references are of record in the file of this patent:

UNITED STATES PATENTS

| Number | Name | Date |
|---|---|---|
| 1,081,932 | Smith | Dec. 16, 1913 |
| 1,231,946 | Schellenbach | July 3, 1917 |
| 1,968,276 | Armitage | July 31, 1934 |
| 1,992,558 | Turnepseed | Feb. 26, 1935 |
| 2,012,249 | Sassen | Aug. 20, 1935 |
| 2,242,445 | Armitage | May 20, 1941 |
| 2,308,708 | Nenninger et al. | Jan. 19, 1943 |
| 2,382,934 | Armitage | Aug. 14, 1945 |
| 2,385,907 | Armitage et al. | Oct. 2, 1945 |
| 2,495,927 | Francis | Jan. 31, 1950 |